United States Patent
Kawamoto et al.

(10) Patent No.: US 8,882,591 B2
(45) Date of Patent: Nov. 11, 2014

(54) STORAGE MEDIUM HAVING IMAGE DISPLAY PROGRAM STORED THEREIN, IMAGE DISPLAY APPARATUS, IMAGE DISPLAY SYSTEM, AND IMAGE DISPLAY METHOD

(75) Inventors: Kouichi Kawamoto, Kyoto (JP); Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 34 days.

(21) Appl. No.: 12/869,311

(22) Filed: Aug. 26, 2010

(65) Prior Publication Data

US 2011/0281644 A1   Nov. 17, 2011

(30) Foreign Application Priority Data

May 14, 2010   (JP) .................................. 2010-112386

(51) Int. Cl.
  *A63F 13/00* (2014.01)
  *G06T 19/00* (2011.01)
(52) U.S. Cl.
  CPC ......... *G06T 19/006* (2013.01); *A63F 2300/695* (2013.01); *A63F 2300/6045* (2013.01); *A63F 2300/1093* (2013.01); *A63F 2300/66* (2013.01)
  USPC .......................................................... 463/31
(58) Field of Classification Search
  CPC .................. A63F 2300/1006; A63F 2300/105; A63F 2300/303; A63F 2300/306; A63F 2300/60
  USPC .......................................................... 463/31
  See application file for complete search history.

(56) References Cited

U.S. PATENT DOCUMENTS

| 5,754,692 | A | 5/1998 | Kondo |
| 5,951,056 | A | 9/1999 | Fukuda et al. |
| 6,330,356 | B1 | 12/2001 | Sundareswaran et al. |
| 6,724,930 | B1 | 4/2004 | Kosaka et al. |
| 7,194,114 | B2 | 3/2007 | Schneiderman |
| 7,515,756 | B2 | 4/2009 | Hashimoto |
| 7,733,409 | B2 | 6/2010 | Fleury |

(Continued)

FOREIGN PATENT DOCUMENTS

| EP | 0717398 A2 | 12/1995 |
| EP | 2093697 A1 | 3/2008 |

(Continued)

OTHER PUBLICATIONS

GE's Augmented Reality Ad http://www.youtube.com/watch?v=5fGav7Fl5P4 Apr. 16, 2009.*

(Continued)

*Primary Examiner* — Damon Pierce
*Assistant Examiner* — Jeffrey Wong
(74) *Attorney, Agent, or Firm* — Nixon & Vanderhye P.C.

(57) ABSTRACT

A game apparatus obtains a captured image from a camera, and repeatedly executes a recognition process on the obtained captured image for recognizing a predetermined object included in the captured image. The game apparatus repeatedly generates and displays a synthesized age obtained by synthesizing an image of a virtual object generated by using a process result of the recognition process with a captured image which is a subject of the recognition process. Here, if the recognition process fails, a captured image which is a subject of a recognition process which has succeeded before is synthesized with an image of a virtual object generated by using a process result of the recognition process.

20 Claims, 13 Drawing Sheets

(56) References Cited

U.S. PATENT DOCUMENTS

| | | |
|---|---|---|
| 7,991,880 B2 | 8/2011 | Balandin |
| 8,009,879 B2 | 8/2011 | Iwai |
| 8,216,036 B2 | 7/2012 | Eyzaguirre |
| 2002/0158873 A1 | 10/2002 | Williamson |
| 2003/0076980 A1 | 4/2003 | Zhang et al. |
| 2005/0069174 A1 | 3/2005 | Uchiyama et al. |
| 2006/0027657 A1 | 2/2006 | Ninnink et al. |
| 2006/0038833 A1 | 2/2006 | Mallinson |
| 2007/0038944 A1 | 2/2007 | Carignano et al. |
| 2007/0102520 A1 | 5/2007 | Carlson et al. |
| 2007/0273644 A1* | 11/2007 | Mondine Natucci ......... 345/156 |
| 2008/0266323 A1 | 10/2008 | Biocca |
| 2009/0195538 A1 | 8/2009 | Ryu |
| 2010/0078478 A1 | 4/2010 | Ao et al. |
| 2011/0159957 A1* | 6/2011 | Kawaguchi et al. ............ 463/31 |

FOREIGN PATENT DOCUMENTS

| | | |
|---|---|---|
| JP | 1-289696 | 11/1989 |
| JP | 7-98208 A | 4/1995 |
| JP | 2000-140435 | 5/2000 |
| JP | 2005-107247 | 4/2005 |
| JP | 2007-233971 A | 9/2007 |
| JP | 2008-140047 A | 6/2008 |
| JP | 2008-146109 | 6/2008 |
| JP | 2008-176357 | 7/2008 |
| JP | 2009-20614 A | 1/2009 |
| JP | 2009-294048 A | 12/2009 |
| WO | 2009/106518 A1 | 9/2009 |

OTHER PUBLICATIONS

GE's Augments Reality Ad Youtube—Posted by Lon Seidman Apr. 16, 2009.*

LG Augmented Reality Retail Experience Uploaded by Timmersion07 Mar. 19, 2010 http://www.youtube.com/watch?v=yA7pShrgoPw.*

Kato et al., "Marker Tracking and HMD Calibration for a Video-Based Augmented Reality Conferencing System", Proceedings of IWAR99 (the $2^{nd}$ International Workshop on Augmented Reality, US, Oct. 1999.

Oshima, "AR<SP>2</SP> Heckey System: A Collaborative Mixed Reality System," Transactions of the Virtual Reality Society of Japan, vol. 3, No. 2, 1998, pp. 55-60, and English translation thereof, 12 pages.

U.S. Appl. No. 12/914,037, filed Oct. 28, 2010.

U.S. Appl. No. 12/915,696, filed Oct. 29, 2010.

Kato et al., "An Augmented Reality System and its Calibration based on Marker Tracking", Journal of Virtual Reality Society of Japan, vol. 4, No. 4, 1999, 10 pages, with a partial English translation.

Tateno et al., "A Nested Marker for Augmented Reality" IEICE Technical Report of the Institute of Electronics, Information and Communication Engineers, Japan, vol. 106, No. 234 Sep. 5, 2006, pp. 19-24, and partial translation thereof, 6 pages.

Aug. 31, 2012 Office Action of U.S. Appl. No. 12/914,037.

Hoff, William A., et al., "Computer Vision-Based Registration Techniques for Augmented Reality," Proceedings of SPIE 2904, Intelligent Robots and Computer Vision XV: Algorithms, Techniques, Active Vision, and Materials Handling, Oct. 29, 1996, pp. 538-548.

Office Action dated Sep. 17, 2013, issued in corresponding U.S. Appl. No. 12/915,696.

Kato, H. et al., "Virtual Object Manipulation on a Table-Top AR Environment," 2000, Proceedings, IEEE and ACM International Symposium on Augmented Reality, 9 pages.

Office Action dated Jan. 28, 2014, issued in U.S. Appl. No. 12/914,037.

Tateno, Keisuke et al., "A Nested Marker for Augmented Reality," IEEE Virtual Reality Conference, Mar. 10-14, 2007, pp. 259-262.

Office Action dated Mar. 29, 2013, issued in corresponding U.S. Appl. No. 12/915,696.

* cited by examiner

STORAGE MEDIUM HAVING IMAGE DISPLAY PROGRAM STORED THEREIN, IMAGE DISPLAY APPARATUS, IMAGE DISPLAY SYSTEM, AND IMAGE DISPLAY METHOD

CROSS REFERENCE TO RELATED APPLICATION

The disclosure of Japanese Patent Application No. 2010-112386, filed May 14, 2010, is incorporated herein by reference.

BACKGROUND OF THE INVENTION

1. Field of the Invention

The present invention relates to a storage medium having stored therein an image display program for displaying an image using an augmented reality technique, an image display apparatus, an image display system, and an image display method.

2. Description of the Background Art

In the prior art, there are augmented reality techniques in which an image of the real space (image captured by a camera) and an image of a virtual space (CG image) are synthesized and displayed together. Non-Patent Document 1 (Hirokazu Kato, Mark Billinghurst, "Marker Tracking and HMD Calibration for a video-based Augmented Reality Conferencing System", proceedings of IWAR99 (the 2nd International Workshop on Augmented Reality), the United States, October 1999) describes a basic image generating method of an augmented reality technique. In an augmented reality technique, markers are placed in the real space, and a camera is used to capture an image around a marker. The marker in the captured image is detected by an image recognition process, and the three-dimensional position of the marker is calculated. It is possible to display an image in which a virtual object is synthesized with the captured image of the real space by generating an image (CG image) of the object in the virtual space by using the calculated three-dimensional position, and displaying the generated image while synthesizing it at the position of the marker in the camera image.

With the conventional augmented reality technique, the real captured image and the virtual CG image may be displayed with misalignment or the CG image may be displayed with flickering.

In an augmented reality technique, it is necessary to calculate the three-dimensional position of a marker by recognizing the marker included in the captured image, and such recognition and calculation processes are time-consuming. Therefore, the CG image generated based on the recognition and calculation process results lags behind the captured image in time. Therefore, when the camera is moved and the captured image changes, a CG image to be synthesized with the captured image lags behind in time and is therefore synthesized at a position before the change, thus resulting in misalignment between the position of the marker in the captured image and the position at which the CG image is synthesized.

In practice, even if a marker is captured, the recognition process may fail by failing to successfully recognize the marker from the captured image. If the recognition process fails, a CG image cannot be generated from the captured image which is the subject of the recognition process, and thus only the captured image is displayed. Therefore, if the recognition process fails intermittently, the CG image is displayed with flickering.

As described above, in the prior art, a CG image may be displayed with misalignment or displayed with flickering, and therefore a synthesized image obtained by synthesizing together a captured image and a CG image may lack realness. Thus, it is not possible to sufficiently achieve the effect of "giving a feel as if the CG image actually existed", which is the characteristic of augmented reality techniques.

SUMMARY OF THE INVENTION

It is therefore an object of the present invention to provide a storage medium having stored therein an image display program capable of displaying a synthesized image with increased realness with an augmented reality technique, an image display apparatus, an image display system, and an image display method.

The present invention employs configurations (1) to (15) below to solve the problems mentioned above.

(1)

The present invention is directed to a computer-readable storage medium having stored therein an image display program for instructing a computer of an information processing apparatus capable of obtaining a captured image from an image-capturing section to function as a recognition section, a synthesis section, and a display control section. The recognition section is a section for repeatedly executing a recognition process on the obtained captured image for recognizing a predetermined object included in the captured image. The synthesis section is a section for repeatedly generating a synthesized image obtained by synthesizing an image of a virtual object generated by using a process result of the recognition process with a captured image which is a subject of the recognition process. The display control section is a section for displaying the synthesized image on a display section. If the recognition process fails, the synthesis section synthesizes a captured image which is a subject of a recognition process which has succeeded before with an image of a virtual object generated by using a process result of the recognition process.

The "information processing apparatus" is a concept that includes any computer that performs an information process by executing a computer program, as well as the game apparatus described in the embodiment below. The "information processing apparatus" is not limited as to whether it is a portable type or not.

The "image display program" is a concept including an application program to be executed by a personal computer or a portable terminal while an example thereof is the game program described in the embodiment below.

The "predetermined object" may be any object as long as it can be recognized by a recognition process, as well as a marker 52 in the embodiment below. For example, the face, etc., of the user (player) may be recognized as the predetermined object.

The "virtual object" may be any object as long as an image thereof is generated for the purpose of being synthesized with a captured image, and the generation method or content of the image of the virtual object may be any method or content.

The "a recognition section" and the "a synthesis section" both execute repeated processes, but the frequencies of repetition (cycles) of their processes do not need to be equal to each other. For example, the frequency of the recognition process by the recognition section may be lower than the frequency of the synthesis process by the synthesis section as in the configuration (7) below or in the embodiment below.

With the configuration (1), the synthesis section generates a synthesized image between an image of a virtual object, which is generated by using a process result of the recognition process, and a captured image. Here, if the recognition process fails, the synthesis section generates a synthesized image by using a captured image which is a subject of a recognition process having succeeded most recently. Therefore, even if recognition fails, a synthesized image including an image of a virtual object is displayed, and therefore it is possible to prevent the virtual object from being displayed with flickering due to the virtual object disappearing (being not displayed) each time recognition fails. The image of the virtual object to be synthesized when the recognition process fails is generated by using a process result of the recognition process having succeeded most recently so as to match the captured image. Therefore, since the image of the virtual object is synthesized with a captured image based on which the image has been generated, no misalignment occurs between the captured image and the virtual object. As described above, with the configuration (1), there is no image flickering or misalignment, thus adding to the realness as if the virtual object were present in the real world. That is, with the configuration (1), it is possible to display a synthesized image with an augmented reality technique with increased realness.

(2)

The synthesis section may generate a synthesized image by updating the image of the virtual object irrespective of the process result of the recognition process.

The phrase "irrespective of the process result of the recognition process" means that the synthesis section generates a synthesized image by updating the image of the virtual object both when the recognition process succeeds and when it fails. If the synthesized image generating interval is shorter than the process time of the recognition process, the synthesis section generates a synthesized image by updating the image of the virtual object even in a situation where the process result of the recognition process has not been obtained (as the timing for generating a synthesized image arrives).

With the configuration (2), the image of the virtual object of the synthesized image is updated with a certain frequency. Therefore, for the virtual object, it is possible to display a smooth motion picture irrespective of the success/failure of the recognition process. Here, with the configuration (1), since the captured image is not updated when the recognition process fails, the motion picture is not displayed smoothly and the user may feel awkward with regard only to the captured image. However, with the configuration (2), since the motion picture of the virtual object, synthesized with the captured image, is displayed smoothly, it is possible to give the user an impression that the synthesized image as a whole is smooth, thus reducing/suppressing the awkwardness the user may feel with the captured image.

(3)

If the recognition process succeeds, the image display program may instruct the computer to further function as a storage control section for storing, in a storage section that can be accessed by the computer, a captured image which is a subject of the successful recognition process and the process result of the recognition process. Then, the synthesis section synthesizes a captured image stored in the storage section with the image of the virtual object generated based on the process result stored in the storage section.

With the configuration (3), if the recognition process succeeds, the captured image which is the subject of the process and the process result are stored in the storage section, and it is therefore possible to easily generate a synthesized image using the captured image.

(4)

If the recognition process succeeds, the storage control section may update storage contents of the storage section so that a captured image which is a subject of the successful recognition process and the process result of the recognition process are stored.

With the configuration (4), the latest captured image for which the recognition process has succeeded and the process result can be stored, and it is therefore possible to reliably generate a synthesized image using the captured image.

(5)

If the recognition process succeeds, the recognition section may calculate, as the process result, a positional relationship between the predetermined object recognized by the recognition process and the image-capturing section or the information processing apparatus. Then, if the recognition process succeeds, the synthesis section generates the image of the virtual object based on the positional relationship calculated from a captured image which is a subject of the successful recognition process. If the recognition process fails, the synthesis section generates the image of the virtual object based on the positional relationship calculated from a captured image which is a subject of a recognition process which has succeeded before.

With the configuration (5), the image of the virtual object is generated based on the positional relationship between the predetermined object and the image-capturing section as the process result of the recognition process. Therefore, it is possible to generate the image of the virtual object as viewed from a direction that reflects the positional relationship between the predetermined object and the image-capturing section, and it is therefore possible to generate/display the image of the virtual object with more realness. With the configuration (5), if the recognition process fails, the image of the virtual object is generated based on the positional relationship calculated from the captured image which is the subject of the recognition process having succeeded most recently, and therefore no misalignment occurs between the captured image and the virtual object. Particularly, if the configuration (2) and the configuration (5) are combined together, the image of the virtual object is displayed with no misalignment of the position at which the virtual object is displayed while updating the action and orientation of the virtual object every time, and it is therefore possible to display the synthesized image with increased realness.

(6)

The image display program may instruct the computer to further function as a game control process section for executing a predetermined game control process of controlling an action of an object appearing in a virtual space by using, as a game input, the process result of the recognition process.

With the configuration (6), an image using an augmented reality technique can be used in a game. With the configuration (6), since the process result of the recognition process is used as a game input, the user (player) can perform the game operation by moving the camera itself. Then, it is possible to provide a novel game using an augmented reality technique, in which the player him/herself actually moves around in the real space that is shown as if a virtual object were present therein.

(7)

If the recognition process fails, the game control process section may execute the game control process by using a process result of a recognition process which has succeeded before.

With the configuration (7), the game control process section can execute the game control process even if the recognition process fails. Therefore, even if the recognition process fails intermittently, it is possible to continuously execute the game control process, and it is possible to smoothly operate an object controlled by the game control process.

(8)

The image display program may instruct the computer to further function as a game process section for executing a predetermined game process irrespective of the process result of the recognition process.

The "game process" may be any process as long as the game progresses, and is a concept including a process in which the process result of the recognition process is not used as a game input as in the process of step S24 in the embodiment below, for example.

With the configuration (8), the progress of the game continues even if the recognition process fails, and therefore the game is prevented from being discontinued frequently when the recognition process fails intermittently. Therefore, a game using an augmented reality technique can be made to progress smoothly without making the player feel unpleasant.

(9)

The game process section may execute, as the game process, a process of controlling the action of the virtual object.

Note that the "process of controlling the action of the virtual object" may be a process of controlling the action of the virtual object according to the input by the user, or a process of controlling the action of the virtual object according to an algorithm predetermined in the game program.

With the configuration (9), as a game process result, an image (motion picture) in which the virtual object moves can be displayed by an augmented reality technique. Moreover, since the game process is executed irrespective of the process result of the recognition process, the image of the virtual object is updated with a certain frequency as in the configuration (2). Therefore, since the motion picture of the virtual object is displayed smoothly, it is possible to give the user an impression that the synthesized image (game image) as a whole is smooth.

(10)

The display control section may display a warning image different from the captured image on the display section in response to a predetermined condition being satisfied as a result of the recognition process having failed successively.

With the configuration (10), if the recognition process has failed successively (to such an extent that the predetermined condition is satisfied), the display transitions from the synthesized image to the warning image. Therefore, by appropriately setting the predetermined condition, it is possible to notify the user of the fact that the recognition process is unlikely to succeed. Here, one may consider a method in which only the image of the virtual object is erased while displaying only the captured image when the recognition process has failed successively. With this method, however, it may be difficult to determine whether the image of the virtual object has disappeared because the virtual object itself has changed (e.g., in an example of a game, an enemy object may disappear as a result of being taken down) or the image of the virtual object has disappeared because of the recognition process failure. In contrast, with the configuration (10), the warning image different from the captured image is displayed, and it is therefore possible to clearly notify the user of the fact that the recognition process has failed successively.

(11)

The display control section may display the warning image on the display section based on the predetermined condition being the recognition process having failed successively over a predetermined period of time.

With the configuration (11), the warning image is displayed when the recognition process has failed successively over a predetermined period of time. In such a case, it is assumed that the recognition process is unlikely to succeed again, and therefore it is possible to warn the user at an appropriate timing with the configuration (11).

(12)

The image display program may instruct the computer to further function as a movement detection section for detecting a movement of the image-capturing section or the information processing apparatus. Then, the display control section may display the warning image on the display section based on the predetermined condition being the movement detection section detecting that the image-capturing section or the information processing apparatus has moved greater than a predetermined criterion.

With the configuration (12), the warning image is displayed when the image-capturing section is moved greater than or equal to a predetermined criterion. In such a case, it is assumed that the recognition process is unlikely to succeed again, and therefore it is possible to warn the user at an appropriate timing with the configuration (12).

(13)

The image display program may instruct the computer to further function as a game control process section for executing a predetermined game control process of controlling the action of the virtual object by using, as a game input, the process result of the recognition process. Then, the game control process section discontinues a progress of the game in response to display of the warning image.

With the configuration (13), the game is discontinued when the warning image is displayed. Therefore, it is possible to prevent the game from progressing while the warning image, which is not a game image (synthesized image), is displayed.

(14)

The display control section may display a captured image obtained at present on the display section in response to a predetermined condition being satisfied as a result of the recognition process having failed successively since the warning image is displayed.

With the configuration (14), the captured image is displayed if a predetermined condition is satisfied after the warning image is displayed. Here, if the warning image continues to be displayed, the user cannot grasp the image being captured by the mage-capturing section and therefore cannot correctly capture an image of the predetermined object, and it becomes difficult to return to a situation where recognition can succeed. In contrast, with the configuration (14), since the captured image is displayed after the warning image, the user can easily correct the direction of the image-capturing section so as to correctly capture an image of the predetermined object, and thus it is possible to easily return to a state where recognition succeeds.

(15)

The display control section may display a captured image obtained at present on the display section in response to a predetermined condition being satisfied as a result of the recognition process having failed successively.

With the configuration (15), if the recognition process has failed successively (to such an extent that the predetermined condition is satisfied) the display transitions from the synthesized image to the warning image. Therefore, by appropriately setting the predetermined condition, it is possible to notify the user of the fact that the recognition process is unlikely to succeed.

The present invention may also be embodied in the form of an image display apparatus including various sections similar to those described above. In such an image display apparatus, the various sections may be implemented by a computer executing an image display program, or some or all of the various sections may be implemented by a dedicated circuit or circuits. The present invention may also be embodied in the form of an image display system including one or more information processing apparatuses each having various sections described above. Then, the one or more information processing apparatuses may communicate with each other directly via a wired or wireless connection, or may communicate with each other via a network. Moreover, the present invention may also be embodied in the form of an image display method performed by the various sections described above.

According to the present invention, if a recognition process for a captured image fails, the process displays a synthesized image between a captured image which is the subject of a recognition process having succeeded most recently and an image of a virtual object generated by using the process result of that recognition process, and it is therefore possible to prevent flickering or misalignment of images, thus displaying a synthesized image with increased realness.

These and other objects, features, aspects and advantages of the present invention will become more apparent from the following detailed description of the present invention when taken in conjunction with the accompanying drawings.

DESCRIPTION OF THE PREFERRED EMBODIMENTS

[Hardware Configuration Of Game Apparatus]

Figure 1:
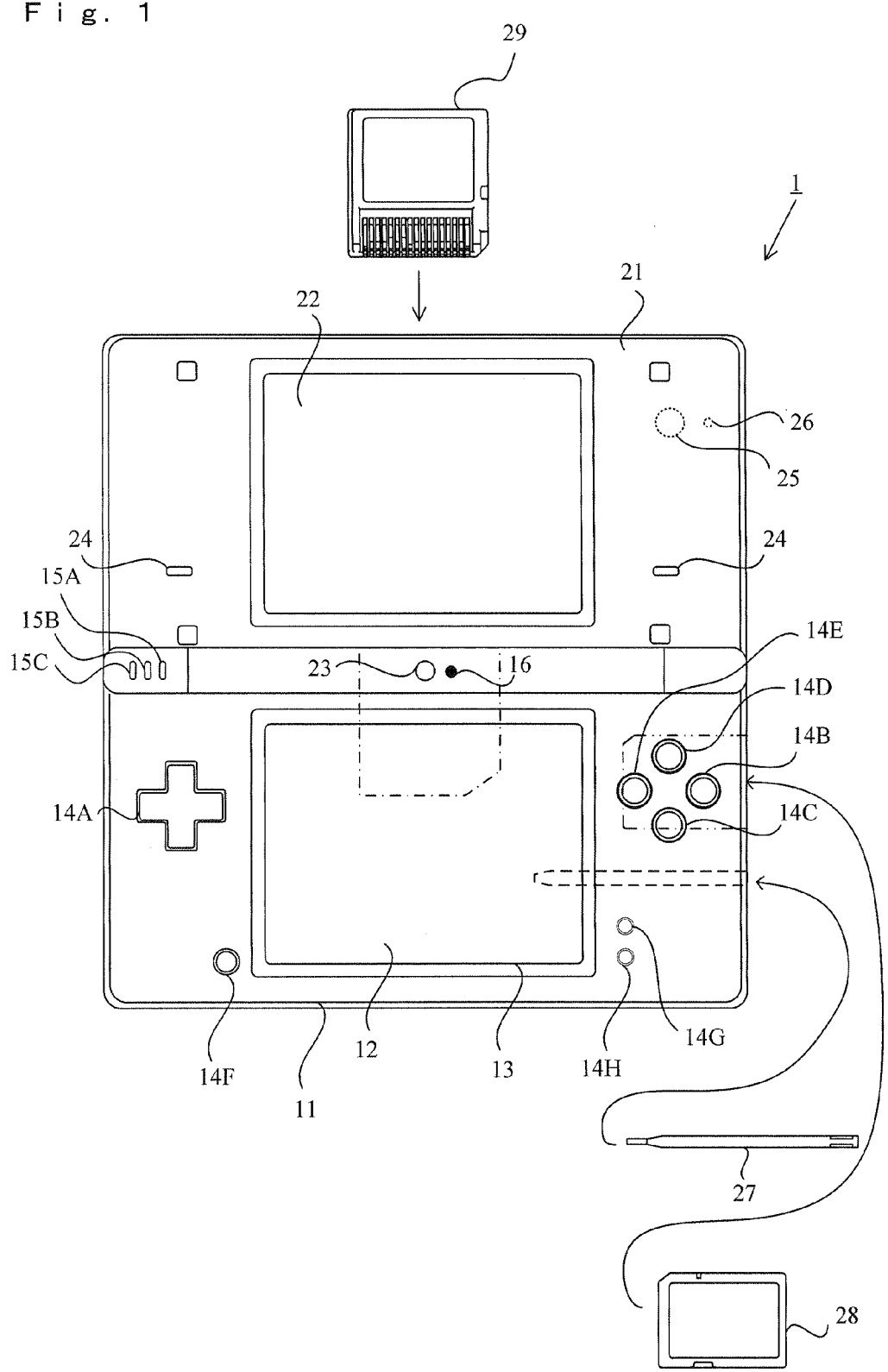
FIG. 1 is an external view of a game apparatus of the present embodiment.

Referring to the drawings, an image display program and an image display apparatus according to one embodiment of the present invention will be described. While the present invention is realized by executing an image display program by any information processing apparatus (computer) which displays an image on a display apparatus, the present embodiment is directed to a case where a game apparatus 1 shown in FIG. 1 is used as an example of the information processing apparatus.

FIG. 1 is an external view of the game apparatus 1 according to the present embodiment. Here, a hand-held game apparatus is shown as an example of the game apparatus 1. Note that the game apparatus 1 includes a camera and functions as an image-capturing device for capturing an image with the camera, displaying the captured image on the screen, and storing data for the captured image.

In FIG. 1, the game apparatus 1 is a foldable hand-held game apparatus, and the game apparatus 1 shown in the figure is unfolded (open state). The game apparatus 1 is structured in a size allowing the user to hold it with both hands, or even one hand, when unfolded.

The game apparatus 1 has a lower housing 11 and an upper housing 21. The lower housing 11 and the upper housing 21 are connected so as to be openable/closable (foldable). In the example of FIG. 1, the lower housing 11 and the upper housing 21 are each formed in the shape of a horizontally elongated rectangular plate, and connected so as to be pivotable at their common long side joint. Typically, the user uses the game apparatus 1 in open state. Also, when the user does not use the game apparatus 1, the game apparatus 1 is stored in closed state. In addition, in the example shown in FIG. 1, the game apparatus 1 can maintain not only the closed and open states but also its opening state via friction force generated at the joint at any angle that can be made by the lower housing 11 and the upper housing 21 between the closed and open states. That is, the upper housing 21 can remain stationary at an arbitrary angle with respect to the lower housing 11.

The lower housing 11 is provided with a lower LCD (Liquid Crystal Display) 12. The lower LCD 12 is horizontally long, and is arranged such that its longitudinal direction coincides with the longitudinal direction of the lower housing 11. Note that in the present embodiment, LCDs are used as display devices to be included in the game apparatus 1, but any other display devices, such as EL (Electro Luminescence) display devices, may be used. In addition, display devices of any resolution can be used for the game apparatus 1. Note that an image being captured by an internal camera 23 or an external camera 25 is displayed in real-time on lower LCD 12.

The lower housing 11 is provided with various operation buttons 14A to 14K and a touch panel 13 as input devices. As shown in FIG. 1, of all the operation buttons 14A to 14K, the direction input button 14A, the operation button 14B, the operation button 14C, the operation button 14D, the operation button 14E, the power button 14F, the start button 14G, and the select button 14H are provided at the inner principal surface of the lower housing 11. The inner principal surface is a surface to be the interior side when the upper housing 21 and the lower housing 11 are folded. In the example shown in FIG. 1, the direction input button 14A and the power button 14F are provided to the left or right (in FIG. 1, to the left) of a lower LCD 12 provided at the center of the inner principal surface of the lower housing 11. In addition, the operation buttons 14B to 14E, the start button 14G, and the select button 14H are provided to the opposite side (in FIG. 1, to the right) of the lower LCD 12 on the inner principal surface of the lower housing 11. The direction input button 14A, the operation buttons 145 to 145, the start button 14G, and the select button 14H are used for various operations on the game apparatus 1. For example, the direction input button 14A is used for selection operations and so on. The operation buttons 14B to 145 are used for setting and cancellation operations and so on. The power button 14F is used for turning ON/OFF the game apparatus 1.

Note that in FIG. 1, the operation buttons 14I to 14K are not shown. For example, the L button 14I is provided at the left edge of the upper surface of the lower housing 11, and the R button 14J is provided at the right edge of the upper surface of the lower housing 11. For example, the L button 14I and the R button 14J are used for image-capturing instruction operations (shutter operations) on the game apparatus 1 having an image-capturing function. Furthermore, the volume button 14K is provided at the left side surface of the lower housing 11. The volume button 14K is used for controlling the volume of a speaker included in the game apparatus 1.

Also, in addition to the operation buttons 14A to 14K, the game apparatus 1 further includes a touch panel 13 as an example of a pointing device that is an input device allowing designation of an arbitrary position on the screen. The touch panel 13 is attached so as to cover the screen of the lower LCD 12. Note that in the present embodiment, a touch panel 13 is, for example, of a resistive film type. However, a touch panel 13 is not limited to the resistive film type, and may be of any type. Also, in the present embodiment, for example, the touch panel 13 has the same resolution (detection accuracy) as the lower LCD 12. However, the touch panel 13 is not necessarily required to be equal in resolution to the lower LCD 12. In addition, the lower housing 11 has an insertion opening (in FIG. 1, indicated by broken lines) provided in its right side surface. The insertion opening can store a touch pen 27 to be used for operating the touch panel 13. Note that any input to the touch panel 13 (touch input) is normally performed with the touch pen 27, but the touch pen 27 is not restrictive, and the touch panel 13 can be operated with the user's finger.

Also, the lower housing 11 has provided in the right side surface an insertion opening (in FIG. 1, indicated by two-dot chain lines) for storing a memory card 28. The insertion opening has provided therein a connector (not shown) for electrically connecting the game apparatus 1 and the memory card 28. The memory card 28 is, for example, an SD (Secure Digital) memory card removably attached to the connector. For example, the memory card 28 is used for storing (saving) images captured by the game apparatus 1 and reading into the game apparatus 1 images generated by other apparatuses.

Furthermore, the lower housing 11 has provided in its upper side surface an insertion opening (in FIG. 1, indicated by one-dot chain lines) for storing a memory card 29. This insertion opening also has provided therein a connector (not shown) for electrically connecting the game apparatus 1 and the memory card 29. The memory card 29 is a storage medium having an information processing program such as a game program stored therein, and is removably loaded into the insertion opening provided in the lower housing 11.

Three LEDs 15A to 15O are provided to the left of the joint between the lower housing 11 and the upper housing 21. Here, the game apparatus 1 is capable of wirelessly communicating with other equipment, and the first LED 15A is lit up while the game apparatus 1 is ON. The second LED 15B is lit up while the game apparatus 1 is being charged. The third LED 15C is lit up when wireless communication is established. Accordingly, the three LEDs 15A to 15O allow the user to know the statuses of the game apparatus 1, regarding ON/OFF of the power supply, battery charge, and communications.

On the other hand, the upper housing 21 is provided with an upper LCD 22. The upper LCD 22 is horizontally long, and is arranged such that its longitudinal direction coincides with the longitudinal direction of the upper housing 12. Note that as in the case of the lower LCD 12, any display device of any other type and resolution may be used instead of the upper LCD 22. Note that a touch panel may be provided over the upper LCD 22. The upper LCD 22 displays, for example, an operation instruction screen for teaching the user about the roles of the operation buttons 14A to 14K and the touch panel 13.

Also, the upper housing 21 is provided with two cameras (an internal camera 23 and an external camera 25). As shown in FIG. 1, an internal camera 23 is provided at the inner principal surface close to the joint of the upper housing 21. On the other hand, the external camera 25 is provided opposite to the side of the inner principal surface where the internal camera 23 is provided, i.e., the external principal surface of the upper housing 21 (the exterior surface of the game apparatus 1 in closed state; the back of the upper housing 21 shown in FIG. 1). Note that in FIG. 1, the external camera 25 is indicated by a broken circle. As a result, the internal camera 23 can capture images of the direction in which the inner principal surface of the upper housing 21 is oriented, while the external camera 25 can capture images of the direction opposite to the image-capturing direction of the internal camera 23, i.e., the direction in which the external principal surface of the upper housing 21 is oriented. In this manner, in the present embodiment, the two cameras, i.e., the internal and external cameras 23 and 25, are provided so as to capture images in their respective directions opposite to each other. For example, the user can use the internal camera 23 to capture images of a view from the game apparatus 1 toward the user, and also can use the external camera 25 to capture images of a view in the opposite direction, i.e., from the user toward the game apparatus 1.

Note that a microphone (microphone 43 shown in FIG. 2) is provided as an audio input device under the inner principal surface close to the joint. In addition, a microphone hole 16 is provided in the inner principal surface close to the joint such that the microphone 43 can sense sound from outside the game apparatus 1. The microphone 43 and the microphone hole 16 are not necessarily required to be positioned at the joint. For example, the microphone 43 may be accommodated within the lower housing 11, and the microphone hole 16 may be provided in the lower housing 11 at a position corresponding to the position where the microphone 43 is accommodated.

Also, a fourth LED 26 (in FIG. 1., indicated by a broken circle) is provided at the external principal surface of the upper housing 21. The fourth LED 26 is lit up at the time the internal camera 23 or the external camera 25 captures an image (when the shutter button is pressed). Furthermore, the light is on while the internal camera 23 or the external camera 25 is capturing a motion picture. As such, the fourth LED 26 allows any subject and bystander to know the game apparatus 1 captured (or is capturing) a picture.

Also, a sound hole 24 is provided to both the left and the right of an upper LCD 22 provided at the center of the inner principal surface of the upper housing 21. A speaker is accommodated within the upper housing 21 below each sound hole 24. The sound hole 24 is a hole for emanating the sound from the speaker to the outside of the game apparatus 1.

As described above, the upper housing 21 is provided with the internal and external cameras 23 and 25 which are image-capturing means for capturing images, as well as the upper LCD 22 acting as a display means for mainly displaying the operation instruction screen. On the other hand, the lower housing 11 is provided with the input devices (the touch panel 13 and the operation buttons 14A to 14K) for operational inputs to the game apparatus 1, and the lower LCD 12 acting as a display means for displaying captured images. Accordingly, when using the game apparatus 1, the user can see a captured image (an image captured by the camera) displayed on the lower LCD 12 and make inputs via the input devices while holding the lower housing 11.

Figure 2:
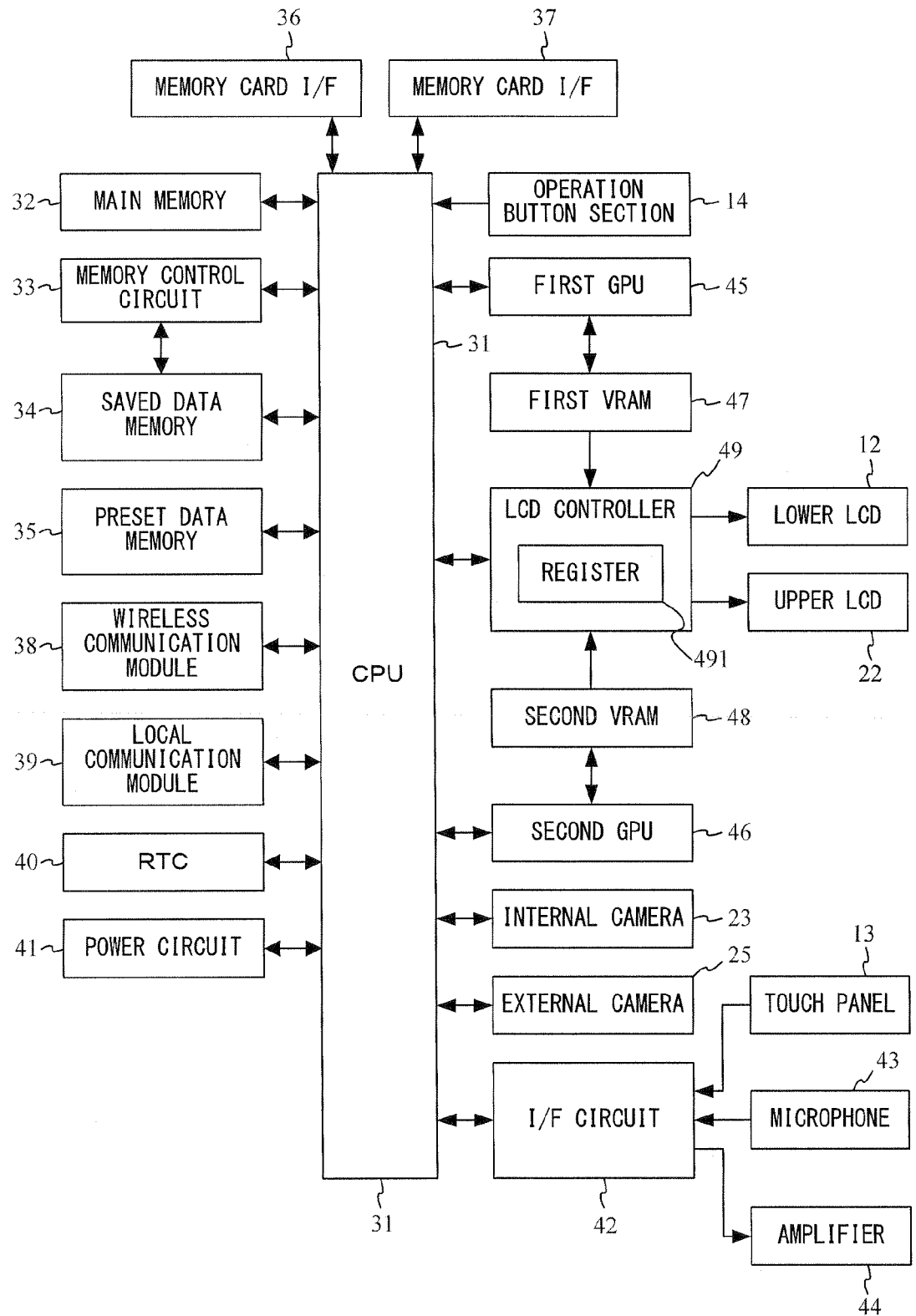
FIG. 2 is a block diagram showing an example of an internal configuration of the game apparatus.

Next, an internal configuration of the game apparatus 1 will be described with reference to FIG. 2. FIG. 2 is a block diagram illustrating an exemplary internal configuration of the game apparatus 1.

In FIG. 2, the game apparatus 1 includes electronic parts, such as a CPU 31, a main memory 32, a memory control circuit 33, a saved data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first CPU (Graphics Processing Unit) 45, a second GPU 46, a first VRAM (Video RAM) 47, a second VRAM 48, and an LCD controller 49. These electronic parts are mounted on an electronic circuit board, and accommodated within the lower housing 11 (or may be accommodated within the upper housing 21).

The CPU 31 is an information processing means for executing a predetermined program (here, an image display program according to the present embodiment). In the present embodiment, the game program is stored, as an example of the image display program, in a memory (e.g., saved data memory 34) within the game apparatus 1 as well as in the memory card 28 and/or 29, and the CPU 31 executes the game program, thereby executing a game process to be described later. Note that the program to be executed by the CPU 31 may be prestored in the memory within the game apparatus 1 or may be acquired from the memory card 28 and/or 29 or from other equipment through communication therewith.

The CPU 31 is connected to the main memory 32, the memory control circuit 33, and the preset data memory 35. The memory control circuit 33 is connected to the saved data memory 34. The main memory 32 is a storage means used as a working area or buffering area for the CPU 31. Specifically, a main memory 32 stores various data to be used in the game process, and programs acquired from outside (e.g., the memory cards 28 and 29 and other equipment). In the present embodiment, for example, a PSRAM (Pseudo-SRAM) is used as the main memory 32. The saved data memory 34 is a storage means for storing, for example, the programs to be executed by the CPU 31 and data for images captured by the internal camera 23 and the external camera 25. The saved data memory 34 is configured by a nonvolatile storage medium, e.g., in the present embodiment, a NAND flash memory. The memory control circuit 33 is a circuit for controlling data reading from/writing to the saved data memory 34 in accordance with an instruction by the CPU 31. The preset data memory 35 is a storage means for storing data (preset data) such as various present parameters for the game apparatus 1. As for the preset data memory 35, a flash memory connected to the CPU 31 via an SPI (Serial Peripheral Interface) bus can be used. The memory card I/Fs 36 and 37 are each connected to the CPU 31. The memory card I/F 36 reads/writes data from/to the memory card 28 attached to the connector in accordance with an instruction from the CPU 31. Also, the memory card I/F 37 reads/writes data from/to the memory card 29 attached to the connector in accordance with an instruction from the CPU 31. In the present embodiment, image data captured by the internal camera 23 and the external camera 25, as well as image data received from other devices are written into the memory card 28, and image data stored in the memory card 28 is read from the memory card 28 and stored to the saved data memory 34 or transmitted to other devices. In addition, various programs stored in the memory card 29 are read and executed by the CPU 31.

Note that the game program may be supplied to a computer system not only via an external storage medium, such as the memory card 29, but also via a wired or wireless communication line. Also, the game program may be pre-recorded to a nonvolatile storage device within the computer system. Note that the information storage medium for storing the game program is not limited to the nonvolatile storage device, and may be a CD-ROM, a DVD, or a similar optical disk storage medium.

The wireless communication module 38 has a function of connecting to a wireless LAN in accordance with a system complying with, for example, the IEEE802.11.b/g standard. Also, the local communication module 39 has a function of wirelessly communicating with similar game apparatuses in accordance with a predetermined communication system. The wireless communication module 38 and the local communication module 39 are connected to the CPU 31. The CPU 31 is capable of transmitting/receiving data to/from other equipment via the Internet using the wireless communication module 38, as well as transmitting/receiving data to/from other similar game apparatuses via the Internet using the local communication module 39.

The CPU 31 is also connected to the RTC 40 and the power circuit 41. The RTC 40 counts time and provides an output to the CPU 31. For example, the CPU 31 can calculate the current time (date) based on the time counted by the RTC 40. The power circuit 41 controls power supplied from the power supply (typically, a battery accommodated in the lower housing 11) provided in the game apparatus 1, and supplies power to various parts of the game apparatus 1.

The game apparatus 1 is also provided with the microphone 43 and an amplifier 44. The microphone 43 and the amplifier 44 are each connected to the I/F circuit 42. The microphone 43 senses the voice of the user speaking to the game apparatus 1, and outputs an audio signal representing the voice to the I/F circuit 42. The amplifier 44 amplifies the audio signal from the I/F circuit 42 to provide an output from the speaker (not shown). The I/F circuit 42 is connected to the CPU 31. Also, the touch panel 13 is connected to the I/F circuit 42. The I/F circuit 42 includes an audio control circuit for controlling the microphone 43 and the amplifier 44 (speaker), and a touch panel control circuit for controlling the touch panel 13. The audio control circuit performs A/D conversion and D/A conversion on the audio signal, and also converts the audio signal into audio data of a predetermined format. The touch panel control circuit generates touch position data (detected coordinate data to be described later) of a predetermined format based on a signal from the touch panel 13, and outputs the generated data to the CPU 31. The touch position data is data representing coordinates of a position detected by the touch panel 13 as being the position at which an input was made to the input screen of the touch panel 13. Note that the touch panel control circuit performs reading of a signal from the touch panel 13 and generation of detected coordinate data once every predetermined period of time.

The above-described operation buttons 14A to 14K constitute an operation button section 14 connected to the CPU 31. The operation button section 14 outputs to the CPU 31 operation data representing the status of input to the operation buttons 14A to 14K (whether or not the buttons have been pressed). The CPU 31 acquires the operation data from the operation button section 14, and executes a process in accordance with an input to the operation button section 14.

The internal camera 23 and the external camera 25 are each connected to the CPU 31. The internal camera 23 and the external camera 25 each capture an image in accordance with an instruction from the CPU 31, and output data for the captured image to the CPU 31. In the present embodiment, the CPU 31 gives an image-capturing instruction to either the internal camera 23 or the external camera 25, and the camera receiving the image-capturing instruction captures an image and transmits image data to the CPU 31. Note that the internal camera 23 and the external camera 25 are also capable of capturing motion pictures. That is, the internal camera 23 and the external camera 25 are also capable of repeatedly capturing images and repeatedly sending the captured data to the CPU 31.

The first GPU 45 is connected to the first VRAM 47, and the second GPU 46 is connected to the second VRAM 48. In accordance with an instruction from the CPU 31, the first GPU 45 generates a first display image based on display image generation data stored in the main memory 32, and creates an image on the first VRAM 47. In accordance with an instruction from the CPU 31, the second GPU 46 generates a second display image, and creates an image on the second VRAM 48, as in the case of the first GPU 45. The first VRAM 47 and the second VRAM 48 are connected to the LCD controller 49. The LCD controller 49 includes a register 491. The register 491 stores the value of 0 or 1 in accordance with an instruction from the CPU 31. When the value in the register 491 is 0, the LCD controller 49 outputs the first display image created on the first VRAM 47 to the lower LCD 12, and also outputs the second display image created on the second VRAM 48 to the upper LCD 22. Alternatively, when the value in the register 491 is 1, the LCD controller 49 outputs the first display image created on the first VRAM 47 to the upper LCD 22, and also outputs the second display image created on the second VRAM 48 to the lower LCD 12. For example, the CPU 31 is capable of causing the lower LCD 12 to display an image acquired from either the internal camera 23 or the external camera 25, while causing the upper LCD 22 to display an operation instruction screen generated by a predetermined process.

[Summary of Image Synthesis Process]

Next, referring to FIGS. 3 to 6, an image synthesis process to be performed during a game process executed by the game program will be described. The game program allows a player to play a game while displaying a game image by using an augmented reality technique in which an image (CG image) of a virtual space is displayed while being synthesized with an image (captured image) of the real space captured by a camera.

Figure 3:
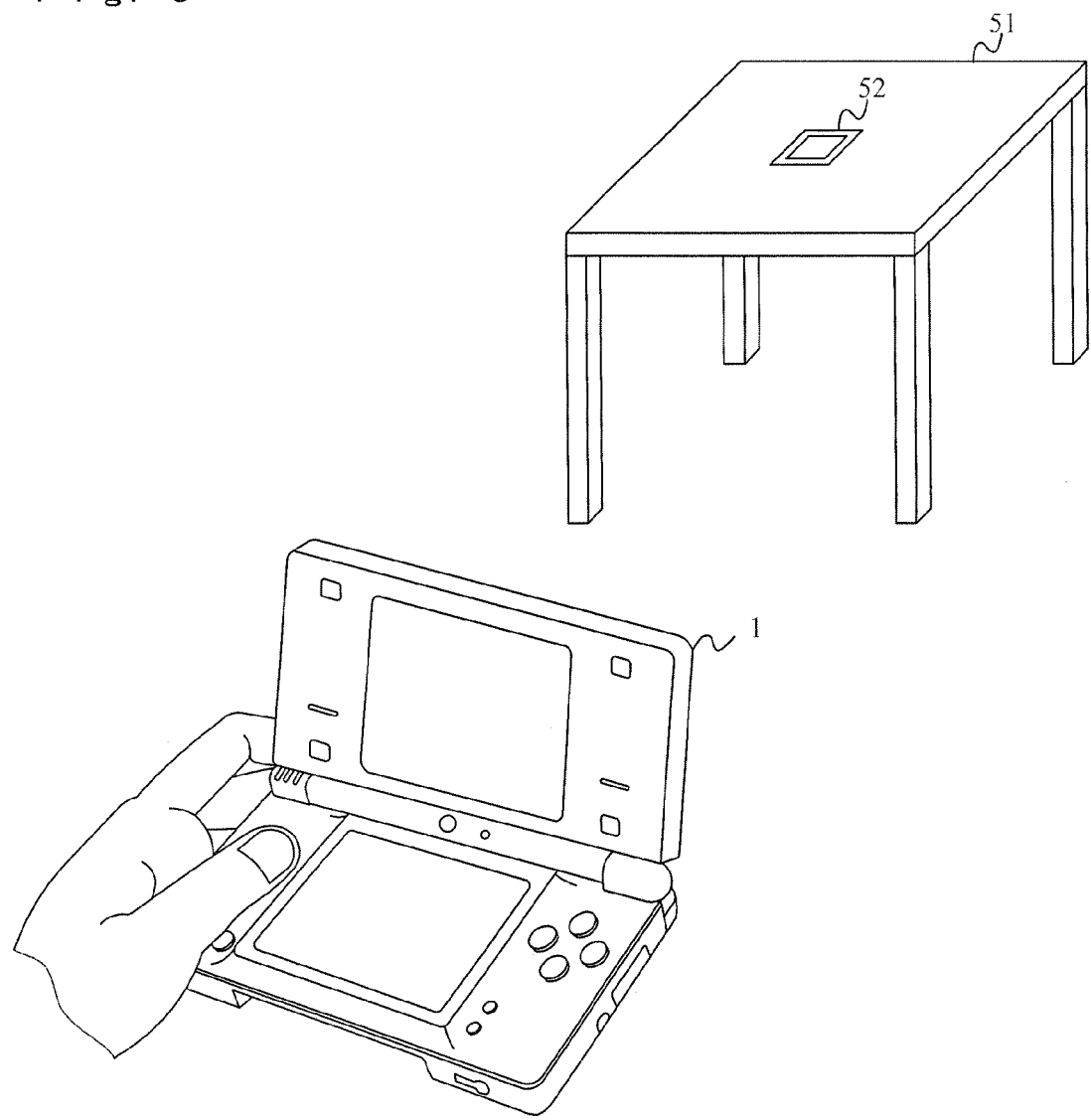
FIG. 3 is a view showing an example of how the game apparatus is used.

FIG. 3 is a view showing an example of how a game apparatus is used. In the present embodiment, the player (user) places a marker 52 in a place (on a table 51 in FIG. 3), and uses the game apparatus 1 to capture an image of the marker 52 and the vicinity thereof, as shown in FIG. 3. The camera used for image-capturing may be either the internal camera 23 or the external camera 25, but the external camera 25 is used in the example described here. The marker 52 in the present embodiment is a thin plate marker with a predetermined pattern drawn thereon. However, the marker is not limited to a dedicated item such as the marker 52 as long as it is recognizable by a recognition process to be described later, and a part (the face, etc.) of the player's body may be used as the marker, for example.

Figure 4:
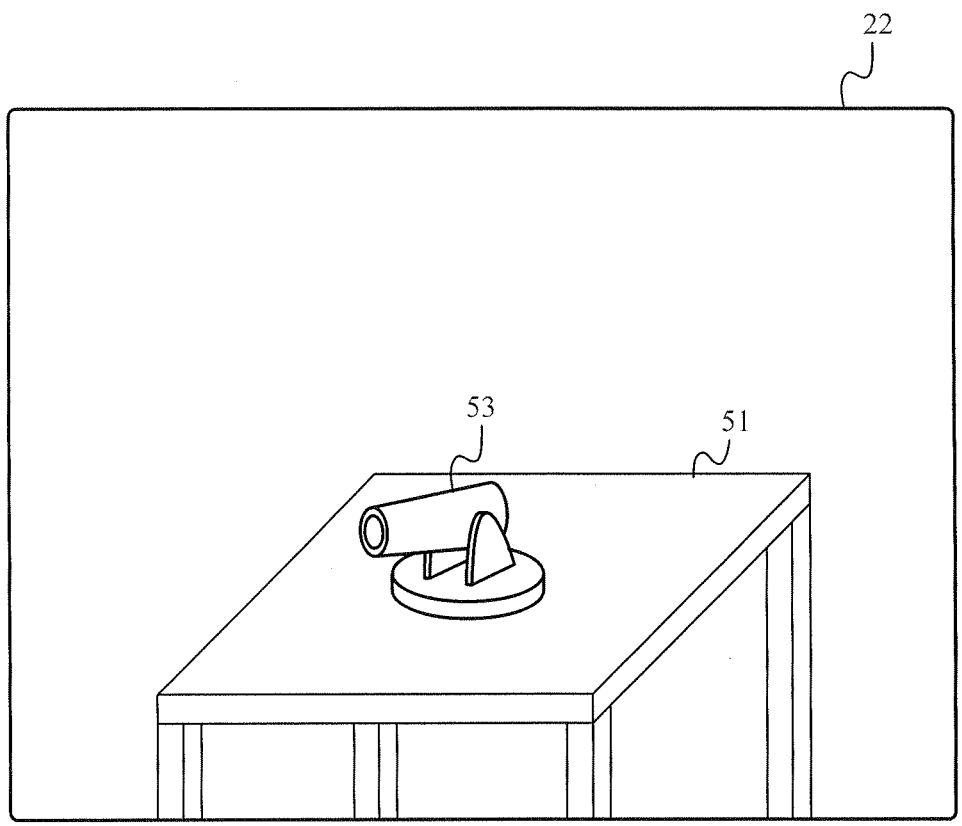
FIG. 4 is a view showing an example of a game image displayed on the game apparatus.

FIG. 4 is a view showing an example of a game image displayed on the game apparatus. FIG. 4 shows a game image to be displayed on the upper LCD 22 of the game apparatus 1 when the game apparatus 1 captures an image of the marker 52 placed on the table 51 as shown in FIG. 3. Note that while the game image is displayed on the upper LCD 22 in the present embodiment, the game image may be displayed on the lower LCD 12. As shown in FIG. 4, an image of a cannon 53, as an image (CG image) of a virtual object in the virtual space, is displayed on the upper LCD 22 while being synthesized with the captured image. Thus, it is possible to display an image which looks as if the cannon 53 were present on the actual table 51. Note that as will be described later in detail, the action of the cannon 53 is controlled by the game program so that the cannon 53 changes its direction or launches a cannonball. That is, in the present embodiment, the image of the virtual object is displayed as a motion picture. Note that while FIG. 4 shows an image of the cannon 53 as an example of the virtual object, the virtual object may be any object.

An image (synthesized image) obtained by synthesizing a CG image with a captured image can be generated by the following process, for example. First, the game apparatus 1 executes a recognition process of recognizing the marker 52 included in the captured image obtained by the camera. When the marker 52 is recognized, the game apparatus 1 calculates the positional relationship between the game apparatus 1 (camera) and the marker 52 from the shape, direction, etc., of the recognized marker 52. The positional relationship is, for example, represented as the three-dimensional position and orientation of one of the game apparatus 1 and the marker 52 with respect to those of the other. Note that when calculating the three-dimensional position, the process may determine the distance therebetween based on, for example, the size (on the captured image), etc., of the recognized marker 52. The game apparatus 1 calculates the positional relationship as a process result of the recognition process. Moreover, the game apparatus 1 calculates the position and orientation of the virtual camera in the virtual space based on the positional relationship. The position and orientation of the virtual camera are calculated so that the positional relationship between the virtual camera and the virtual object in the virtual space coincides with the positional relationship between the game apparatus 1 and the marker 52 in the real space. Once the position of the virtual camera is determined, the game apparatus 1 generates a CG image of the virtual object as viewed from the position of the virtual camera, and synthesizes the CG image of the virtual object with the captured image. By the process above, the game apparatus 1 can generate and display a synthesized image. Note that the recognition process (the process of calculating the positional relationship) and the process of calculating the position of the virtual camera from the positional relationship may be similar to those of a conventional augmented reality technique.

Figure 5:
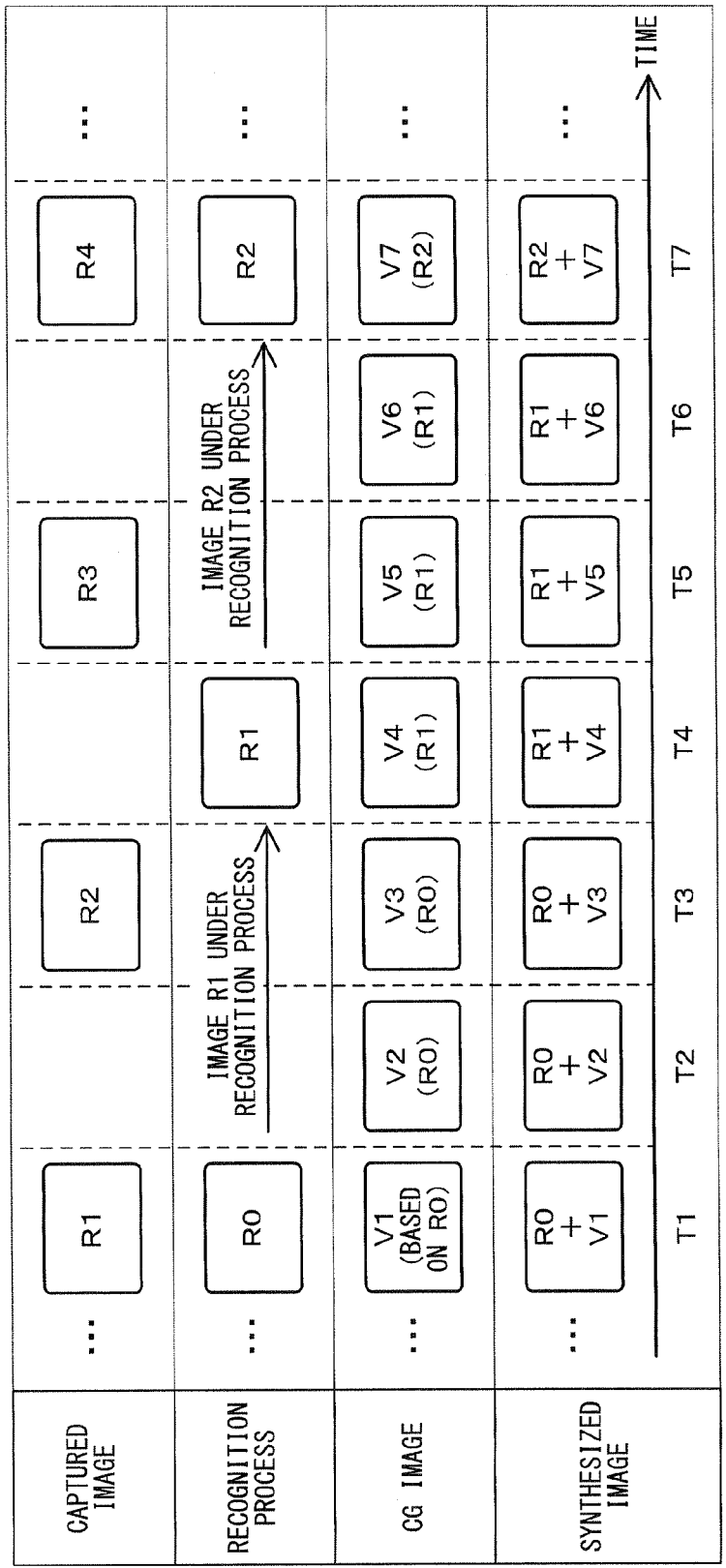
FIG. 5 is a diagram illustrating a process of generating a synthesized image.
Figure 6:
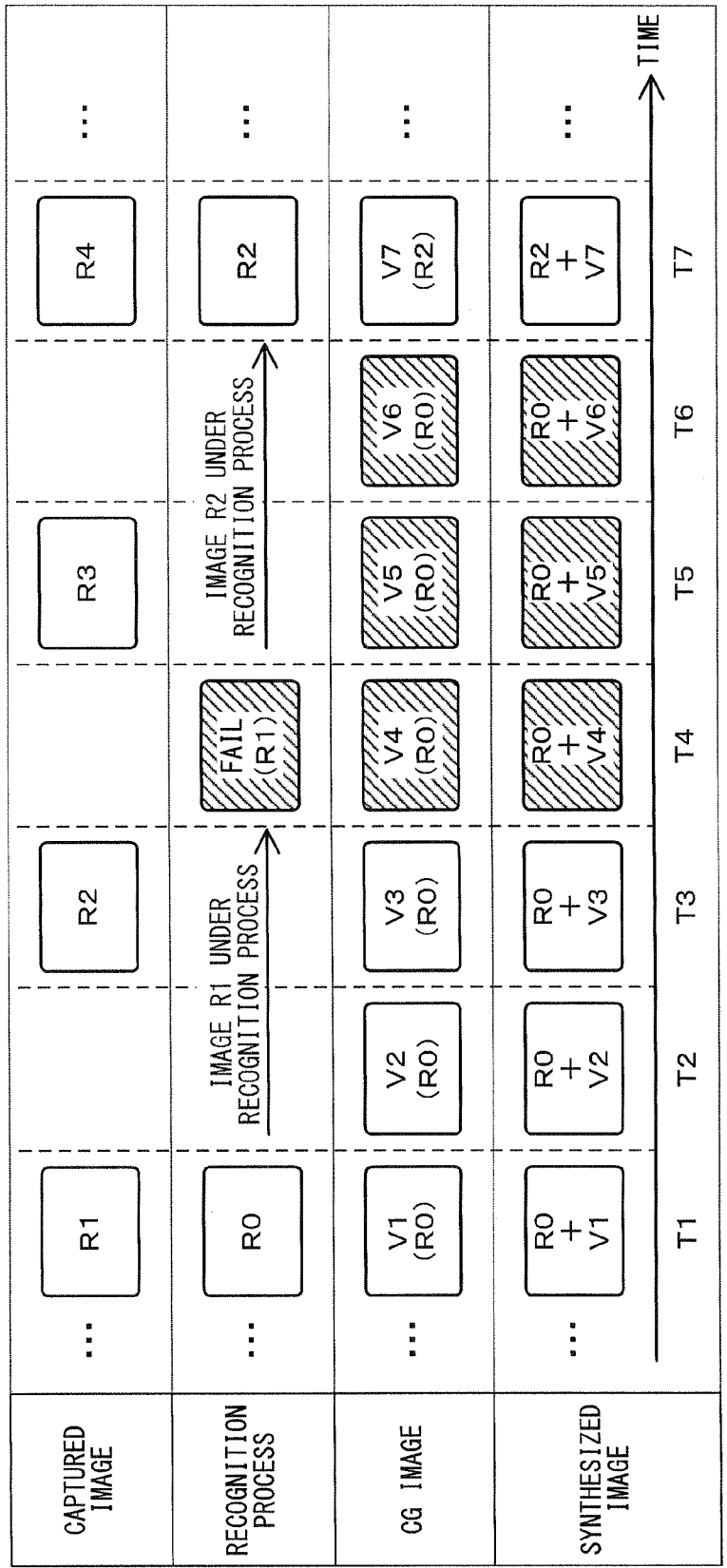
FIG. 6 is a diagram illustrating a process of generating a synthesized image where recognition fails.

Here, with an augmented reality technique in which a CG image is displayed while being synthesized with a captured image, the captured image and the CG image may be displayed with misalignment or the CG image may be displayed with flickering, thus detracting from the realness of the synthesized image, as described above as a problem to be solved by the present invention. In view of this, the present invention attempts to add to the realness of the synthesized image by the process to be described below. Referring to FIGS. 5 and 6, a process of generating a synthesized image will now be described.

FIG. 5 is a diagram illustrating a process of generating a synthesized image. In FIG. 5 (also in FIG. 6 to be referred to later), the horizontal axis represents time, and the sections "captured image", "CG image" and "synthesized image" each represent the timing at which the image is obtained (generated). The section "recognition process" represents the timing at which the recognition process for a captured image is completed. Note that it is assumed in FIG. 5 that CG images are generated at an interval of a predetermined period of time (one frame period), whereas captured images are obtained at an interval longer than the CG image generating interval, and that the amount of time required for the recognition process is longer than the CG image generating interval.

In the present embodiment, a recognition process is executed for a captured image, a CG image is generated based on the process result, and the captured image and the CG image are displayed while being synthesized together, as described above. Note that a CG image is generated based on the process result of a recognition process, and a recognition process is time-consuming. Therefore, at a point in time when a CG image is generated, the captured image based on which the CG image is generated is not the latest image, and the latest captured image is a different image from the captured image based on which the CG image has been generated (see, for example, tame T1, T4 and T7 shown in FIG. 5).

In the present embodiment, when generating a synthesized image, the game apparatus 1 synthesizes a CG image with a captured image for which the recognition process has been completed, but not with the latest captured image obtained. For example, in FIG. 5, at time T1, the recognition process is completed for a captured image R0 which has been obtained prior to time T1, and the recognition process is not completed for a captured image R1 obtained at the current time T1. Therefore, at time T1, a CG image V1 is synthesized with the captured image R0, but not with the captured image R1. Here, the CG image V1 is an image generated based on the process result of the recognition process for the captured image R0. Therefore, at time T1, the CG image V1 is synthesized with the captured image R0 based on which the CG image V1 is generated, and thus there will be no such misalignment as described above. At time T2 and T3, the recognition process for the captured image R1 is unfinished, and CG images V2 and V3 are generated based on the result of the recognition process for the captured image R0 like at time T1 since the next recognition process has not been completed. Therefore, a synthesized image is generated using the captured image R0 also at time T2 and T3 like at time T1. That is, since the CG images V2 and V3 are synthesized with the captured image R0 based on which the CG images V2 and V3 are generated, it is possible also at time T2 and T3 to prevent such misalignment as described above like at time T1. Thus, the game apparatus 1 generates a synthesized image by using a captured image for which the recognition process has been completed until the next recognition process is completed.

Note that in FIG. 5, also at and after time T4, a CG image is synthesized with a captured image based on which the CG image has been generated, like at time T1 to T3. That is, since the recognition process for the captured image R1 is completed at time T4, the CG images V4 to V6 which are generated based on the captured image R1 are synthesized with the captured image R1 at time T4 to T6, respectively. Since the recognition process for a captured image R2 is completed at time T7, a CG image V7 generated based on the captured image R2 is synthesized with the captured image R2 at time T7.

As described above, the game apparatus 1 can prevent such misalignment as described above because the captured image based on which the CG image is generated coincides with the captured image used for generating a synthesized image.

Next, consider a case where the recognition process fails. Even if the camera captures an image of the marker 52, the recognition thereof may fail by failing to correctly recognize the marker 52 in the recognition process for reasons such as reflection light entering the marker 52, a change of the color of the marker 52 within the captured image due to light, etc. In the present embodiment, the game apparatus 1 appropriately synthesizes a captured image and a CG image together even considering cases where recognition fails.

FIG. 6 is a diagram illustrating a process of generating a synthesized image where recognition fails. In FIG. 6, a case is assumed where the recognition process for the captured image R1 fails at time T4. In this case, the game apparatus 1 cannot generate a CG image based on the captured image R1. If it is so configured that no CG image is displayed (because a CG image cannot be generated due to recognition failure), the CG image will be displayed with flickering when recognition fails intermittently. Therefore, in the present embodiment, the game apparatus 1 generates a CG image V4 based on the result of the recognition process for the latest captured image R0 successfully recognized. That is, since the game apparatus 1 does not immediately stop generating a CG image in response to recognition failure, it is possible to prevent the CG image from being displayed with flickering.

Moreover, in the present embodiment, the CG image V4 at time T4 is synthesized with the last captured image R0 successfully recognized (see FIG. 6) but not with the latest captured image R1 for which the recognition process is completed at time T4. If it is so configured that a synthesized image is generated by using the latest captured image R1 for which the recognition process is completed, as in a case where recognition succeeds (the case at time T4 in FIG. 5), the captured image based on which the CG image V4 has been generated will be different from the captured image to be used for synthesis, thus resulting in misalignment described above. In view of this, in the present embodiment, if the recognition fails, the game apparatus 1 generates a synthesized image using the latest captured image successfully recognized. Then, even if the recognition fails, it is possible to synthesize a CG image with a captured image based on which the CG image has been generated, thereby preventing misalignment.

As described above, in the present embodiment, if a recognition process fails, the game apparatus 1 synthesizes a captured image which is the subject of the recognition process having succeeded most recently with a CG image generated by using the process result of that recognition process. Therefore, it is possible to prevent a CG image from being displayed with flickering and to prevent a CG image from being displayed while being misaligned with the captured image, thus improving the realness of the synthesized image. That is, it is possible to sufficiently achieve the effect of "giving a feel as if the CG image actually existed", which is the characteristic of augmented reality techniques.

Note that if a recognition process fails, "a captured image which is the subject of the recognition process having succeeded most recently" is used for generating the synthesized image in the present embodiment. In other embodiments, the captured image to be used for generating the synthesized image when the recognition process fails is not limited to a captured image which is the subject of the recognition process having succeeded most recently (i.e., the last one to have succeeded), but may be a captured image which is the subject of any recognition process which has succeeded before.

Note that in the present embodiment, the last captured image for which the recognition process has succeeded is used for a synthesized image, and therefore if recognition fails, one captured image is displayed over a long period of time, and apparently the motion picture of the displayed synthesized image may not be smooth. However, in the present embodiment, the CG image of the synthesized image is updated every time irrespective of success/failure of the recognition process, and therefore the motion picture of the CG image is displayed smoothly. Thus, it is believed that the user will not feel unnatural about the motion picture of the synthesized image as a whole, and will not feel awkwardness.

Note that while the present embodiment assumes a case where the amount of time required for the recognition process is longer than the CG image generating interval, the present invention is effective also in a case where the amount of time required for the recognition process is equal to (or shorter than) the CG image generating interval. How the present invention is effective also in such a case will now be described with reference to FIG. 7.

Figure 7:
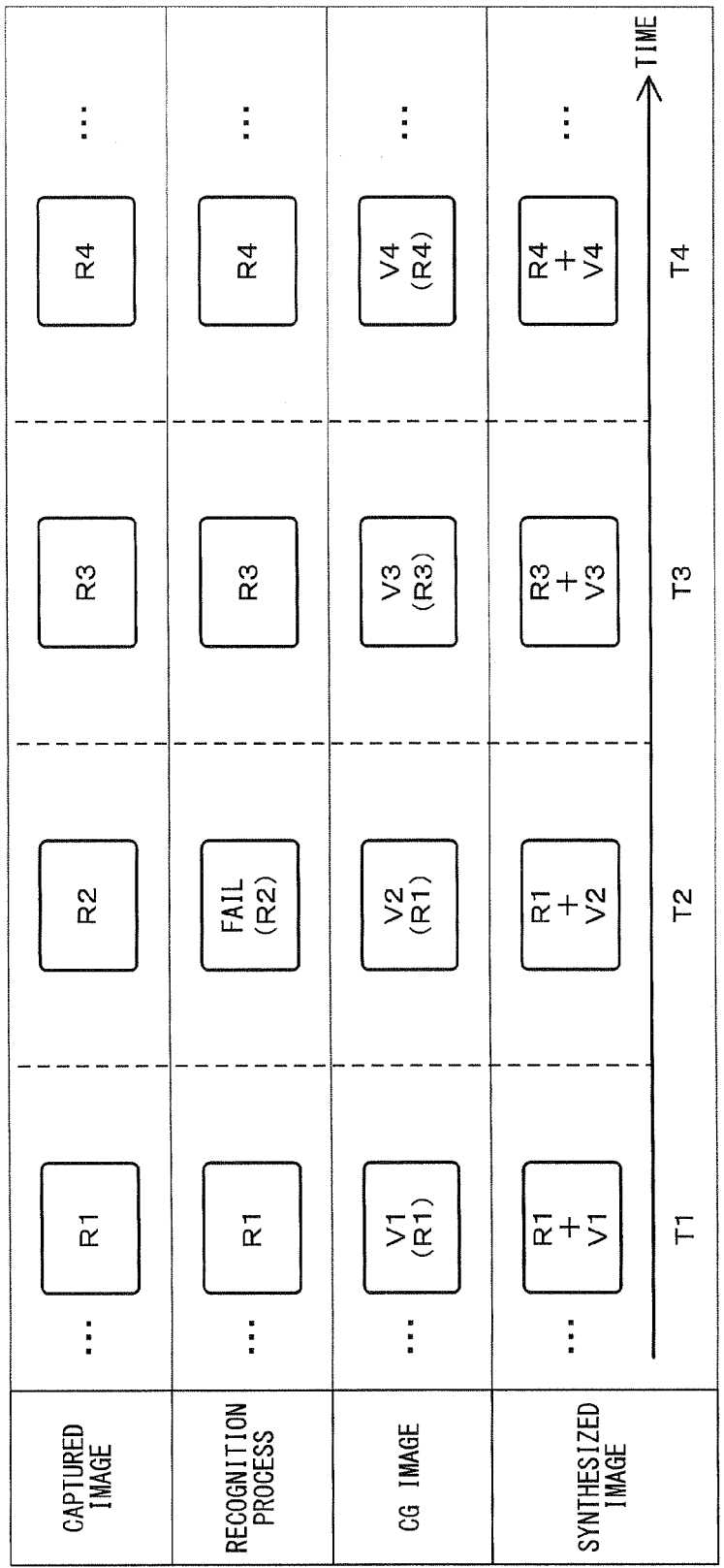
FIG. 7 is a diagram showing a synthesis process where the captured image obtaining interval and the amount of time required for the recognition process are set to be equal to the CG image generating interval.

FIG. 7 is a diagram showing a synthesis process where the captured image obtaining interval and the amount of time required for the recognition process are set to be equal to the CG image generating interval. FIG. 7 assumes a case where a captured image is obtained and a recognition process for the captured image is completed every frame period (the unit time in which a CG image is generated).

In FIG. 7, it is assumed that recognition of the captured image R2 failed at time T2. If no CG image is displayed at time T2 (because of the recognition process failure), the CG image will be displayed with flickering. If the CG image V1 based on the captured image R1 and the captured image R2 are to be synthesized together at time T2, there may occur misalignment between the captured image R2 and the CG image V1. In contrast, according to the present invention, the game apparatus 1 synthesizes the captured image R1 which is the subject of the recognition process having succeeded most recently with the CG image V2 generated by using the process result of that recognition process, like at time T4 shown in FIG. 6. Thus, the game apparatus 1 can prevent the flickering of a CG image and the misalignment between a captured image and a CG image, as in the above embodiment.

[Details of Game Process]

Next, referring to FIGS. 8 to 12, the details of the game process executed by the game program will be described. Hereinafter, a game in which a player character controlled by the player attempts to hit the cannon 53 with a cannonball as shown in FIG. 4 will be described, as an example of a game performed by the game process. Specifically, in the present game, the cannon 53, whose operation is controlled by the game program so that the cannon 53 changes its direction or launches a cannonball, is displayed as a game image. The present game is a so-called "first-person shooter game", and the position of the virtual camera in the virtual space is used also as the position of the player character. That is, the player can move the player character in the virtual space by changing the positional relationship between the game apparatus 1 and the marker 52 by moving the game apparatus 1 around. The player can make the player character launch a cannonball by performing a predetermined operation. In the present game, the player plays the game by attempting to hit the cannon 53 with a cannonball while moving the player character around so as not to be hit with a cannonball of the cannon 53.

Figure 8:
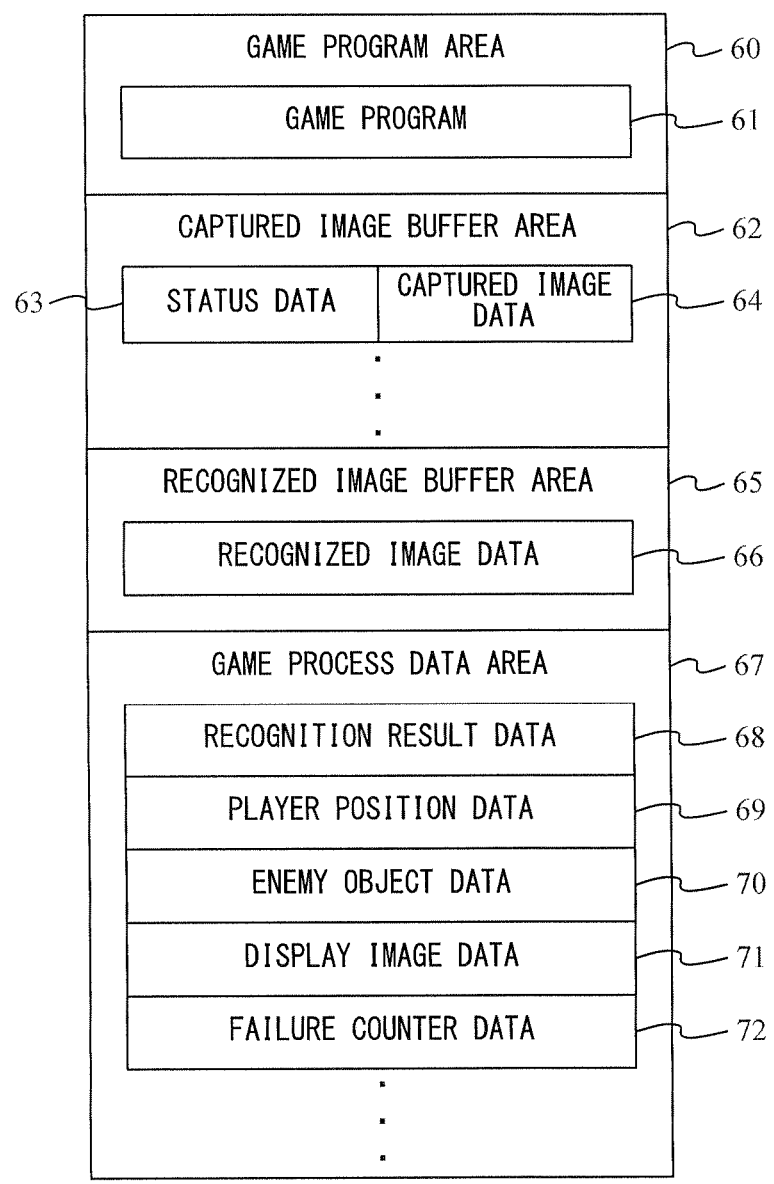
FIG. 8 is a diagram showing various data to be used in processes performed by a game program.

First, various data used in the game process will be described. FIG. 8 is a diagram showing various data to be used in processes performed by the game program. In FIG. 8, a game program area 60, a captured image buffer area 62, a recognized image buffer area 65 and a game process data area 67 are set in a main memory 32 of the game apparatus 1.

The game program area 60 is an area for storing a game program 61 for instructing the CPU 31 of the game apparatus 1 to execute a game process (FIG. 9) to be described later. A part or whole of the game program 61 is read out from the memory card 29 at an appropriate timing so as to be stored in the main memory 32. The game program 61 includes a program for executing the image synthesis process described above, and a program for executing the recognition process.

The captured image buffer area 62 stores image data of the image captured by the camera (captured image data). The captured image buffer area 62 can store a predetermined number of (e.g., 3) pieces of captured image data. The captured image data stored in the captured image buffer area 62 is managed so that the oldest piece of the captured image data, except for the one currently under the recognition process, is deleted and updated to new captured image data. Specifically, status data 63 and captured image data 64 are stored, while being associated with each other, in the captured image buffer area 62. The status data 63 is data representing the status of the captured image data 64 associated therewith, and specifically indicates one of the statuses "to be overwritten", "under recognition process", and "available for process".

The recognized image buffer area 65 stores, among other captured image data, captured image data for which the recognition process has been successfully completed (referred to as the recognized image data) 66. That is, the recognition process is performed on the captured image data 64 stored in the captured image buffer area 62, and if the recognition process succeeds, the captured image data 64 is stored in the recognized image buffer area 65. Note that the recognized image buffer area 65 only needs to store only the latest recognized image data 66. As will be described later in detail, captured image data stored in the recognized image buffer area 65 is the subject of the synthesis process to be synthesized with a CG image.

The game process data area 67 is an area for storing various data used in the game process. The game process data area 67 stores recognition result data 68, player position data 69, enemy object data 70, display image data 71, and failure counter data 72. Note that in addition to those described above, the game process data area 67 stores various data necessary for the game, such as data of various objects (e.g., the cannon 53) appearing in the game, and sound data such as BGM.

The recognition result data 68 is data representing the process result of the recognition process described above, and is specifically data representing the positional relationship described above. The positional relationship is represented as a three-dimensional position of one of the game apparatus 1 and the marker 52 with respect to that of the other, or as a three-dimensional direction from one to the other, and is therefore represented by three-dimensional coordinates, a three-dimensional vector, or the like.

The player position data 69 is data representing the position of the player character in the virtual space (game space). As described above, in the present embodiment, the position of the virtual camera in the virtual space is also used as the position of the player character. That is, it can be said that the player position data 69 also represents the position of the virtual camera in the virtual space. The player position data 69 is calculated based on the recognition result data 68.

The enemy object data 70 is data representing various parameters of the enemy object (i.e., the cannon 53). The various parameters include parameters representing the direction of the cannon 53, the number of times the player has hit it with a cannonball, etc.

The display image data 71 is data of the game image displayed on the display apparatus (the upper LCD 22). As will be described later in detail, data of a warning image to be described later or a captured image may be displayed, in addition to a synthesized image described above, in the present game process.

The failure counter data 72 is data representing the failure counter. The failure counter represents the amount of time elapsed since the first failure in a case where the recognition process fails successively. That is, if the recognition process fails, the CPU 31 starts counting the failure counter, and continues to count the failure counter while the recognition process keeps failing.

Figure 9:
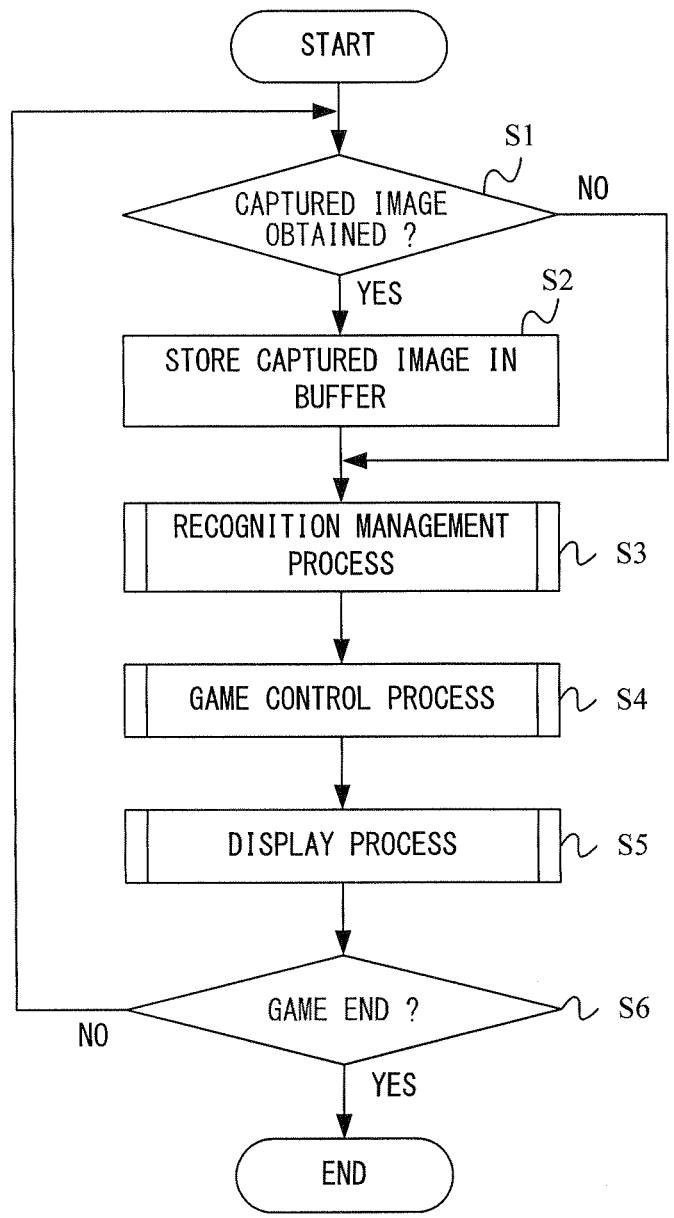
FIG. 9 is a main flow chart showing the flow of a game process executed by the game apparatus.

Next, the details of the game process performed by the game apparatus 1 will be described with reference to FIGS. 9 to 12. FIG. 9 is a main flow chart showing the flow of a game process executed by the game apparatus 1. When the power button 14F is pressed down and the power of the game apparatus 1 is turned ON, the CPU 31 of the game apparatus 1 displays a menu screen (e.g., an image including images (icons) representing various applications) used for instructing to start various applications. On the menu screen, the user instructs to start the game program 61, e.g., instructs to select the icon of the game program 61. When the start of the game program 61 is instructed on the menu screen, the CPU 31 initializes the main memory 32, etc., and starts executing the game program 61 for performing the process shown in FIG. 4. In the present embodiment, as the game program 61 is executed, the CPU 31 functions as various sections recited in the claims. That is, the game program 61 instructs the CPU 31 to function as various sections recited in the claims.

First, in step S1, the CPU 31 determines whether a captured image has been obtained. That is, it determines whether data of a captured image has been sent from a camera (the external camera 25 in the present embodiment). Note that it is assumed in the present embodiment that while the process loop through steps S1 to S6 is executed once every frame period (1/60 sec), the camera sends a captured image with a lower frequency (once every about a few frame periods). If the determination result of step S1 is affirmative, the process of step S2 is executed. On the other hand, if the determination result of step S1 is negative, the process of step S2 is skipped, and the process of step S3 is executed.

In step S2, the CPU 31 stores the captured image data obtained in step S1 in the captured image buffer area 62 of the main memory 32. Note that if the maximum number of pieces of the captured image data 64 that can be stored are already stored in the captured image buffer area 62, the CPU 31 deletes one piece and newly stores (updates) the captured image data obtained. The captured image data 64 to be deleted is the captured image data 64 associated with the status data 63 which indicates "to be overwritten". When the writing of the new captured image data 64 is completed, the CPU 31 changes the status data 63 associated with the captured image data 64 so as to indicate "available for process". It also changes the status data 63 associated with the oldest one of pieces of the captured image data 64 whose status data 63 indicate "available for process" so as to indicate "to be overwritten". As described above, the oldest piece of the captured image data 64, except for the one currently under the recognition process, is updated to new captured image data. The process of step S3 is executed, following step S2.

In step S3, the CPU 31 executes the recognition management process. In the recognition management process, the recognition process for a captured image is executed, and a data updating process, etc., are executed based on the result of the recognition process. The details of the recognition management process will now be described with reference to FIG. 10.

Figure 10:
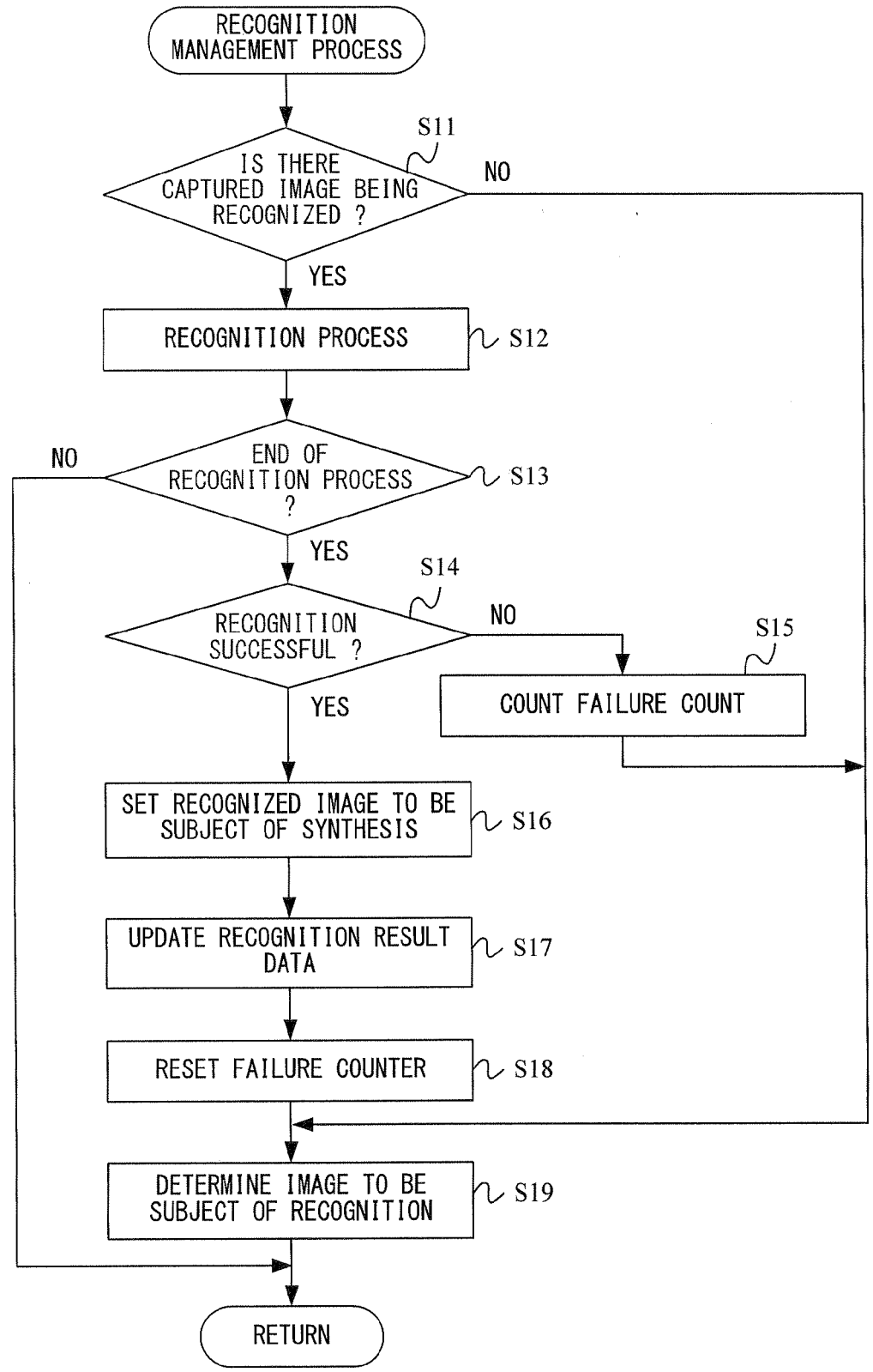
FIG. 10 is a flow chart showing the flow of a recognition management process (step S3) shown in FIG. 9.

FIG. 10 is a flow chart showing the flow of a recognition management process (step S3) shown in FIG. 9. In the recognition management process, first, in step S11, the CPU 31 determines whether there is a captured image under the recognition process. That is, the CPU 31 determines whether there is an image, among the captured images stored in the captured image buffer area 62, which is being the subject of the recognition process. This determination can be made based on whether there is a piece of the captured image data 64 whose status data 63 indicates "under recognition process". If the determination result of step S11 is affirmative, the process of step S12 is executed. On the other hand, if the determination result of step S11 is negative, the process of step S19 to be described later is executed.

In step S12, the CPU 31 executes the recognition process for the captured image. In the present embodiment, a series of recognition process operations (one iteration of the recognition process) until the recognition result for one captured image is calculated may not always be executed with the same cycle as the display process which is executed with a cycle of one frame period. Typically, it may be difficult to complete one iteration of the recognition process within one frame period, and in such a case, only a part of the entire recognition process is executed in one iteration of the process of step S12. In this case, the process to be executed in one iteration of step S12 is adjusted to such an amount of process that a series of processes through steps S1 to S6 can be completed within one frame period.

If the recognition process is completed (i.e., if the recognition result is calculated) in the process of step S12, the CPU 31 stores the data of the recognition result in the main memory 32. Specifically, if the recognition process succeeds, data of the positional relationship described above is stored in the main memory 32 as the recognition result. On the other hand, if the recognition process fails (if the marker 52 cannot be recognized from the captured image), data representing a recognition failure is stored in the main memory 32 as the recognition result. On the other hand, if the recognition process is not completed in the process of step S12, the CPU 31 stores data necessary for executing the remaining recognition process in the main memory 32 and ends the process of step S12. When the process of step S12 is executed next, the remaining process is executed by using the data stored in the main memory 32. The process of step S13 is executed, following step S12 described above.

In step S13, the CPU 31 determines whether the recognition process for one captured image has been completed. That is, the determination result of step S13 is affirmative if the process result of the recognition process is obtained in step S12, and the determination result of step S13 is negative if the process result of the recognition process is not obtained in step S12. If the determination result of step S13 is affirmative, the process of step S14 is executed. On the other hand, if the determination result of step S13 is negative, the CPU 31 ends the recognition management process.

In step S14, the CPU 31 determines whether the process result of the recognition process executed in step S12 is successful. The determination of step S14 can be made by referencing data of the recognition result stored in the main memory 32 at the end of step S12. If the determination result of step S14 is negative, the process of step S15 is executed. On the other hand, if the determination result of step S14 is affirmative, the process of step S16 to be described later is executed.

In step S15, the CPU 31 counts the failure counter. That is, the value of the failure counter represented by the failure counter data 72 is incremented by one, and data representing the incremented value is stored in the main memory 32 as new failure counter data 72. Thus, it is possible to measure the amount of time elapsed since the recognition process failed. The process of step S19 to be described later is executed, following step S15.

In steps S16 to S18, a data updating process, etc., which are necessary when the recognition process succeeds are executed. In step S16, the CPU 31 sets the captured image for which the recognition process has been completed in step S12 as the subject of the synthesis process. Specifically, the CPU 31 newly stores the captured image data 64 for which the recognition process has been completed in the recognized image buffer area 65 as the recognized image data 66. Thus, the recognized image data 66 is updated. Note that the captured image data 64 for which the recognition process has been completed is one of the pieces of the captured image data 64 stored in the captured image buffer area 62 whose status data 63 is "under recognition process". As will be described later in detail, the recognized image data 66 stored in the recognized image buffer area 65 is the subject to be synthesized with a CG image. The process of step S17 is executed, following step S16.

In step S17, the CPU 31 updates the recognition result data 68 stored in the main memory 32. That is, data representing the recognition result stored in step S12 is stored in the main memory 32 as new recognition result data 68. The process of step S18 is executed, following step S17.

In step S18, the CPU 31 resets the failure counter. That is, the value of the failure counter data 72 stored in the main memory 32 is set to 0. The process of step S19 is executed, following step S18.

In step S19, the CPU 31 determines a captured image to be the subject for which the recognition process is executed next. Here, the captured image data to be the new subject of the recognition process is the latest one of the pieces of the captured image data 64 stored in the captured image buffer area 62 whose status data 63 indicates "available for process". The CPU 31 changes the status data 63 associated with the captured image data 64 to be the subject of the recognition process so that it indicates "under recognition process". Thus, in the next iteration of step S12, the recognition process is executed for the piece of the captured image data 64 whose status data 63 has been changed to "under recognition process". The CPU 31 changes the status data 63, which had indicated "under recognition process" since before step S19, to "to be overwritten", so as to avoid a case where there are a plurality of pieces of the status data 63 that indicate "under recognition process". After step S19, the CPU 31 ends the recognition management process.

Note that with step S19 described above, when one iteration of the recognition process ends, the next recognition process is executed for the latest one of the captured images obtained. Therefore, a captured image that is not the latest one may be discarded without being subjected to a recognition process. Here, if it is so configured that the recognition process is executed successively for all of the captured images obtained, and if the amount of time required for one iteration of the recognition process is longer than the captured image obtaining interval, there will gradually be more and more captured images to be displayed for which the recognition process has been completed. That is, the captured images displayed may gradually lag behind the real time. In contrast, according to the present embodiment, the recognition process is not performed for a captured image that is not the latest one, and it is therefore possible to prevent the accumulation of delays of captured images to be displayed.

With the recognition management process described above, when a recognition process ends for a captured image and if the recognition is successful (YES in steps S13 and S14), the captured image is set to be the subject of the synthesis process (step S35 to be described later) (step S16). That is, a synthesized image is generated by using a captured image for which the recognition process has succeeded. On the other hand, if the recognition fails (NO in step S14), the process of step S16 is not executed, and therefore the captured image is not set to be the subject of the synthesis process. Therefore, if the recognition fails, the captured image to be the subject of the synthesis process remains unchanged, and the same captured image as that of the previous iteration is used in the synthesis process. That is, if the recognition fails, the captured image which is the subject of the recognition process having succeeded most recently continues to be used in the synthesis process. In the recognition management process, also when the recognition process fails to end, the process of step S16 is not executed, and therefore the captured image to be the subject of the synthesis process remains unchanged and the same captured image as that of the previous iteration is used in the synthesis process. Therefore, in the synthesis process, the same captured image as that of the previous iteration (i.e., the captured image which is the subject of the recognition process having succeeded most recently) is used until the recognition process ends.

Referring back to FIG. 9, in step S4, following the recognition management process (step S3), the CPU 31 executes the game control process. In the game process, the action of an object in the virtual space is controlled based on the game input from the player, etc. The details of the game control process will now be described with reference to FIG. 11.

Figure 11:
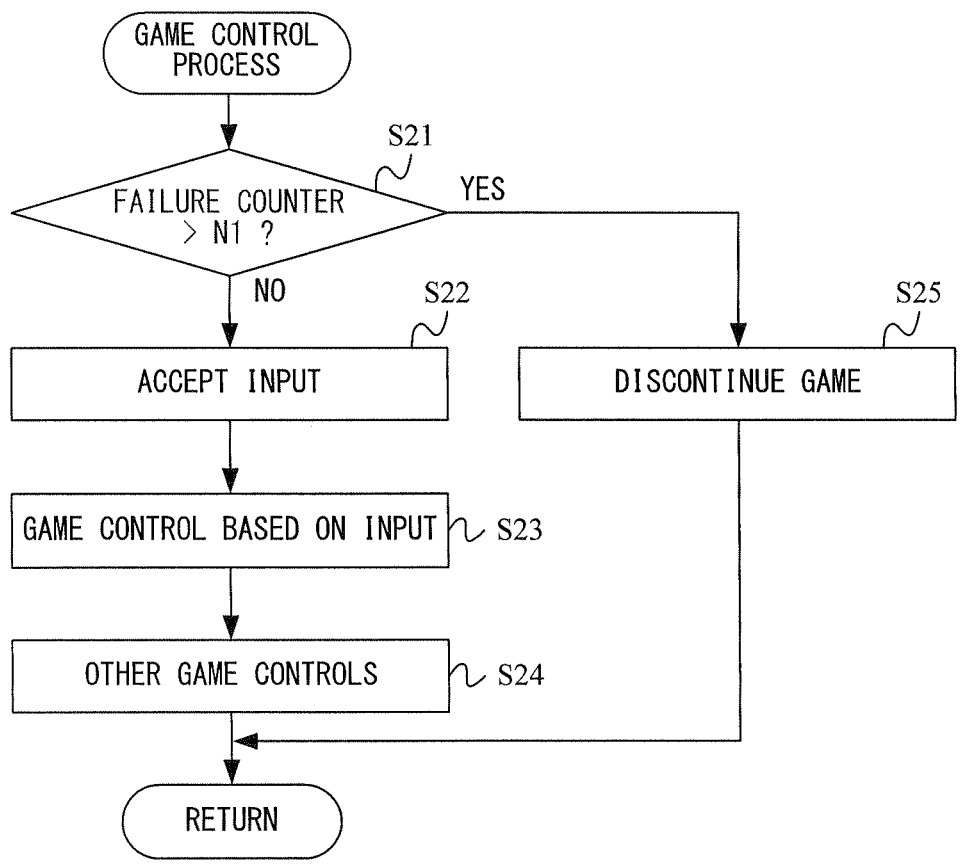
FIG. 11 is a flow chart showing the flow of a game control process (step S4) shown in FIG. 9.

FIG. 11 is a flow chart showing the flow of the game control process (step S4) shown in FIG. 9. In the game control process, first, in step S21, the CPU 31 determines whether the value of the failure counter is greater than a predetermined first threshold N1. That is, the CPU 31 reads out the failure counter data 72 stored in the main memory 32, and compares the value of the failure counter data 72 with the first threshold N1. Note that the first threshold N1 is predetermined, and is set to an appropriate value depending on the content of the game, etc. Here, the value of the failure counter represents the amount of time elapsed since the first failure in a case where the recognition process fails successively. That is, the determination process of step S21 is a process for determining whether the recognition process has failed successively over a predetermined period of time. If the determination result of step S21 is negative, the process of step S22 is executed. On the other hand, if the determination result of step S21 is affirmative, the process of step S25 to be described later is executed.

In step S22, the CPU 31 accepts a game operation input from the player. Specifically, the CPU 31 obtains touch position data representing the position at which an input has been made on the input surface of the touch panel 13, and obtains operation data representing the status of input to the operation buttons 14A to 14K (whether or not the buttons have been pressed). The process of step S23 is executed, following step S22.

In step S23, the CPU 31 performs a game control based on the input. Here, in the present embodiment, not only the input to the input devices (the touch panel 13 and the operation buttons 14A to 14K) accepted in step S22 described above, but also the recognition result data 68 are used as game inputs. Specifically, the CPU 31 calculates the position (and orientation) of the player character based on the recognition result data 68. In the present embodiment, the position and orientation of the player character are the same as the position and orientation of the virtual camera. That is, the position of the player character is calculated so that the position of the player character with respect to the cannon is a position according to the positional relationship represented by the recognition result data 68 (the positional relationship between the game apparatus 1 and the marker 52 in the real space). The orientation of the player character (the orientation of the virtual camera) is calculated so that the cannon 53 is displayed at the position of the marker 52 on the display screen. More specifically, in the process, the CPU 31 reads out the recognition result data 68 from the main memory 32, calculates the position of the player character based on the recognition result data 68, and stores data representing the calculated position in the main memory 32 as the player position data 69. As an action in response to an input on the input device, the CPU 31 performs, for example, an operation of launching a cannonball from the player character in response to the depression of a predetermined button. The process of step S24 is executed, following step S23.

In step S24, the CPU 31 performs other game controls other than the process executed in step S23. The process executed in step S24 may be, for example, controlling the action of the cannon 53 (the action of changing the direction of the cannon 53 or launching a cannonball), determining whether objects are hit by a cannonball, and calculating the score, etc. Note that data representing parameters of the cannon 53 (parameters representing the direction, etc., of the cannon 53) are stored in the main memory 32 as the enemy object data 70. After step S24, the CPU 31 ends the game control process shown in FIG. 11.

On the other hand, in step S25, the CPU 31 discontinues the game. Here, a case where step S25 is executed is a case where the recognition process fails successively over a predetermined period of time. As will be described later in detail, if the recognition process fails successively over a predetermined period of time (if the value of the failure counter becomes greater than or equal to the first threshold N1), a warning image indicating that the recognition has not been successful is displayed instead of a synthesized image (step S34 to be described later). If a warning image is displayed, the game cannot proceed, and therefore the CPU 31 discontinues the progress of the game in step S25. After step S25, the CPU 31 ends the game control process shown in FIG. 11.

With the game control process described above, the process result of the recognition process is used as a game input. That is, the action of the object (player character) appearing in the virtual space is controlled based on the recognition result data 68 (step S23). Then, the player can move the player character by moving the game apparatus 1 (or by the player him/herself moving). Therefore, in the present embodiment, there is displayed a game image obtained by synthesizing an object (the cannon 53) in the virtual space with a captured image representing the real space (FIG. 4), and the position of the game apparatus 1 in the real space is reflected on the position of the object (player character) in the virtual space. Thus, it is possible to provide a novel game using an augmented reality technique, in which the player him/herself actually moves around in the real space that is shown as if a virtual object were present therein.

Referring back to FIG. 9, the CPU 31 executes a display process of generating and displaying the synthesized image, the warning image, etc., described above in step S5, following the game control process (step S4). The details of the display process will now be described with reference to FIG. 12.

Figure 12:
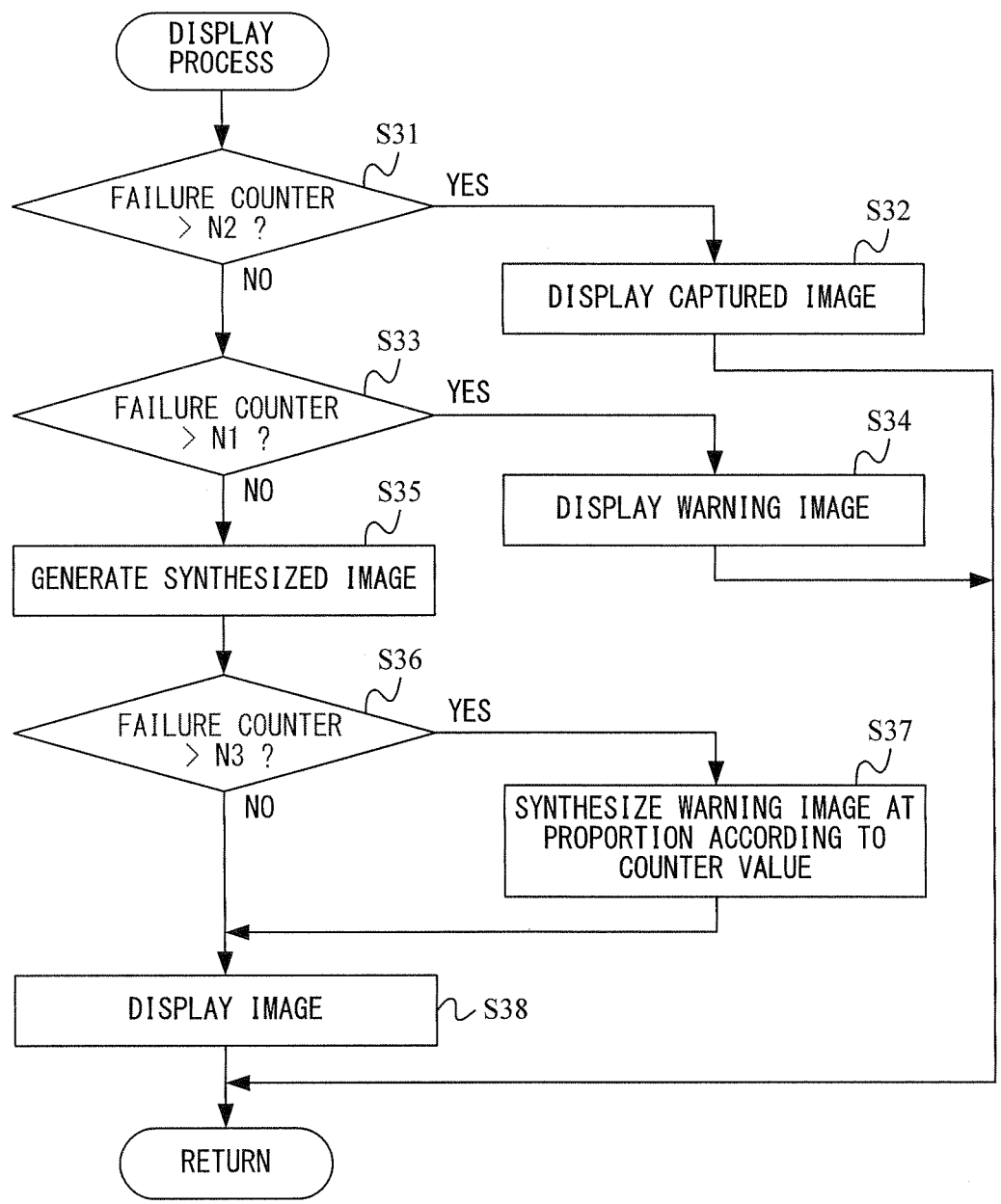
FIG. 12 is a flow chart showing the flow of a display process (step S5) shown in FIG. 9.

FIG. 12 is a flow chart showing the flow of the display process (step S5) shown in FIG. 9. In the display process, first, in step S31, the CPU 31 determines whether the value of the failure counter is greater than a predetermined second threshold N2. That is, the CPU 31 reads out the failure counter data 72 stored in the main memory 32, and compares the value of the failure counter data 72 with the second threshold N2. Note that the second threshold N2 is greater than the first threshold N1, and is pre-set to an appropriate value depending on the content of the game, etc. The determination process of step S31 is a process for determining whether the recognition process has failed successively over a predetermined period of time corresponding to the second threshold N2. If the determination result of step S31 is affirmative, the process of step S32 is executed. On the other hand, if the determination result of step S31 is negative, the process of step S33 to be described later is executed.

In step S32, the CPU 31 displays the captured image on the display apparatus (the upper LCD 22). Specifically, the CPU 31 displays the captured image data sent from the camera on the upper LCD 22. Thus, if the failure counter is greater than or equal to the second threshold N2, only the captured image is displayed, and the CG image is not synthesized therewith. After step S32, the CPU 31 ends the display process.

On the other hand, in step S33, the CPU 31 determines whether the value of the failure counter is greater than the predetermined first threshold N1. The process of step S33 is the same as the process of step S21 described above. If the determination result of step S33 is affirmative, the process of step S34 is executed. On the other hand, if the determination result of step S33 is negative, the process of step S35 to be described later is executed.

In step S34, the CPU 31 displays a warning image on the display apparatus (the upper LCD 22). The warning image is an image for warning the player of the fact that the recognition of the marker 52 has failed successively over a predetermined period. The warning image may be any image, but is preferably an image different from the captured image or an image that does not include the captured image. In the present embodiment, so-called "snow noise image" (which may include text such as "Marker not recognized") is displayed as the warning image. The CPU 31 may use, as the warning image, a motion picture or a still picture provided in advance in the game program 61. After step S34, the CPU 31 ends the display process.

On the other hand, in step S35, the CPU 31 generates a synthesized image obtained by synthesizing together the captured image and the CG image. Here, the captured image data used for the synthesis is captured image data (the recognized image data 66) stored in the recognized image buffer area 65. That is, in the present embodiment, the latest captured image for which the recognition process has succeeded (a captured image for which the recognition process has succeeded most recently) is used for the generation of the synthesized image. The data of the synthesized image generated is stored in the main memory 32 as the display image data 71.

Note that in the present embodiment, a synthesized image is generated by a method in which a captured image is used as the background for the image of the virtual space. That is, the CPU 31 places a background object behind the cannon 53 (as viewed from the virtual camera) in the virtual space, and the CPU 31 uses the captured image as the texture of the background object when generating an image of the virtual space as the cannon 53 is viewed from the position of the virtual camera in the direction of the virtual camera. Thus, it is possible to generate a synthesized image in which a CG image of the cannon 53 is synthesized on the captured image. Note that the position and orientation of the virtual camera are calculated as the position and orientation of the player character in step S23 described above. The action of the cannon 53 (the direction, etc., of the cannon 53) is calculated in step S24 described above. Note that in other embodiments, the CPU 31 may generate a synthesized image by first generating a CG image and then synthesizing the CG image with a captured image. The process of step S36 is executed, following step S35.

In step S36, the CPU 31 determines whether the value of the failure counter is greater than a predetermined third threshold N3. That is, the CPU 31 reads out the failure counter data 72 stored in the main memory 32, and compares the value of the failure counter data 72 with the third threshold N3. The third threshold N3 is smaller than the first threshold N1, and is pre-set to an appropriate value depending on the content of the game, etc. The determination process of step S36 is a process for determining whether the recognition process has failed successively over a predetermined period of time corresponding to the third threshold N3. If the determination result of step S36 is affirmative, the process of step S37 is executed. On the other hand, if the determination result of step S36 is negative, the process of step S37 is skipped, and the process of step S38 is executed.

In step S37, the CPU 31 further synthesizes a warning image with a synthesized image in a proportion according to the value of the failure counter. The method for synthesizing together the synthesized image and the warning image may be any method, and may be a method based on a typical alpha blending process. Then, the CPU 31 determines the alpha value, which represents the transparency of the warning image, so that the transparency is 100% when the value of the failure counter is "N3", 0% when the value of the failure counter is "N1", and the transparency decreases as the value of the failure counter increases from "N3" to "N1". Then, the synthesized image and the warning image are synthesized together according to the determined alpha value. By the process of step S37 described above, it is possible to generate an image in which the warning image gradually grows thicker while the synthesized image grows paler in the course of time (as the value of the failure counter increases). The image data generated in step S37 is stored in the main memory 32 as the display image data 71. The process of step S38 is executed, following step S37.

In step S38, the CPU 31 displays the synthesized image on the display apparatus (the upper LCD 22). Specifically, the CPU 31 reads out the display image data 71 from the main memory 32 and displays it on the upper LCD 22. Thus, a game image (FIG. 4) is displayed in which a CG image of a game object (the cannon 53) is synthesized with a captured image.

Note that in step S38, the synthesized image generated in step S35 is displayed as it is, when the recognition process has succeeded or when the value of the failure counter is smaller than the third threshold N3. On the other hand, when the value of the failure counter is greater than or equal to the third threshold N3, an image is displayed in which the synthesized image and the warning image are synthesized together. Since the transparency of the warning image varies depending on the value of the failure counter, when the value of the failure counter is greater than or equal to the third threshold N3, a game image is displayed in which the warning image gradually grows thicker (the synthesized image grows paler) in the course of time. After step S38, the CPU 31 ends the display process.

By the display process described above, a synthesized image is displayed when the recognition process has succeeded (No in steps S31, S33 and S36). Even when the recognition process has failed, a synthesized image is displayed until the failure continues over a period of time corresponding to the third threshold N3 because the determination result of steps S31, S33 and S36 is negative. Thereafter, when the recognition process failure time exceeds a period of time corresponding to the third threshold N3, the determination result of step S36 becomes affirmative, and therefore an image is displayed in which a warning image (a snow noise image) is synthesized with a synthesized image. Then, as the time passes, the warning image grows thicker (step S37). Moreover, when the recognition process failure time exceeds a period of time corresponding to the first threshold N1, the determination result of step S33 becomes affirmative, and therefore only the warning image is displayed. At the timing when the warning image is displayed, the game is discontinued (step S25). Therefore, with the display process described above, even if the recognition process fails, the display of the CG image does not stop instantly, and therefore a CG image will not be displayed with flickering. Moreover, when the recognition process failure continues successively over a predetermined period of time or more, a warning image is displayed, and it is thus possible to notify the player of the fact that the recognition process has failed.

Note that one may consider displaying the captured image (containing no CG image) as the warning image. If the captured image is displayed as the warning image, it appears to the player as if the virtual object had disappeared. However, there may possibly be a case where the virtual object is no longer displayed as the game advances (e.g., where the virtual object has been destroyed), and in such a case, it is difficult for the player to determine whether the recognition has failed. In contrast, according to the present embodiment, an image different from the captured image is displayed as the warning image, and it is therefore possible to more reliably notify the player of the fact that the recognition process has failed. Moreover, in the present embodiment, the warning image is displayed so that it gradually grows thicker in the course of time, and therefore it is possible to give a notification with reduced awkwardness to the player as compared with a case where a warning image is displayed abruptly. Note that in other embodiments, the CPU 31 may display the captured image without displaying the warning image when the recognition process has failed successively. That is, in the display process shown in FIG. 12, the CPU 31 may omit the processes of steps S33 and S34 described above. Still, it is possible to notify the player of the fact that the recognition process has failed, as in the above embodiment.

Moreover, with the display process described above, if the recognition process failure time exceeds a period of time corresponding to the second threshold N2 after the warning image is displayed, the determination result of step S31 becomes affirmative, thereby displaying only the captured image. This is because if the process continues to display the warning image, the player can no longer grasp the image being captured by the game apparatus 1, thus failing to correctly capture an image of the marker 52. That is, in the present embodiment, after the warning image is displayed and the game is discontinued, the captured image is displayed so that the player can easily correct the direction of the game apparatus 1 so as to correctly capture an image of the marker 52.

Referring back to FIG. 9, the CPU 31 determines whether the game should be ended in step S6 following the display process (step S5). The determination of step S6 is made based on, for example, whether the game has been cleared, the game has been over, the player has given an instruction to quit the game, etc. If the determination result of step S6 is negative, the process of step S1 is executed again. The process loop through steps S1 to S6 is repeatedly executed until it is determined in step S6 that the game should be ended. On the other hand, if the determination result of step S6 is affirmative, the CPU 31 ends the game process shown in FIG. 9. The game process is as described above.

As described above, with the game process described above, if the recognition process for a captured image succeeds, the captured image is stored in the recognized image buffer area 65 (step S16) and used in the synthesized image (step S35). Then, the CG image to be synthesized is generated based on the successful recognition result. On the other hand, if the recognition process fails, the captured image is not used in the synthesized image, and the previous captured image is maintained in the recognized image buffer area 65. Thus, if the recognition process fails, a synthesized image is generated and displayed by using the captured image for which the recognition process has succeeded most recently. The CG image to be synthesized is also generated based on the recognition result obtained when the recognition process succeeded most recently. Then, even if recognition failure occurs intermittently, the CG image is not displayed with flickering and there will be no misalignment between the captured image and the CG image. Therefore, according to the present embodiment, it is possible to generate and display a synthesized image with higher realness.

In the game process, the process (step S24) of controlling the action of the displayed virtual object (the cannon 53) is executed every frame. Not only when the recognition succeeds, but also when it fails, the image of the virtual object is displayed while being synthesized with the captured image over a certain period of time (while step S33 returns No). Therefore, the action of the virtual object is updated every frame, and the virtual object is displayed as a motion picture. Therefore, even if the captured image is not updated every frame, it is possible to display a smooth motion picture as a synthesized image without giving the player an impression that the number of frames of the motion picture is low.

Note that in the game process described above, while the action of the virtual object is updated every frame (step S24), the process (step S23) of determining the display position of the virtual object (the position and orientation of the virtual camera) is performed by using the recognition result data updated when the recognition succeeds (step S17). Therefore, according to the present embodiment, it is possible to prevent the misalignment between the captured image and the image of the virtual object while displaying the action of the virtual object as a smooth motion picture that is updated every frame.

With the game process described above, if the recognition process fails successively over a predetermined period of time corresponding to the first threshold N1, a warning image is displayed, and the game is discontinued (step S25). That is, in the present embodiment, the progress of the game is discontinued in response to the display of the warning image. Here, in the present embodiment, the CG image is displayed even if the recognition fails, and it is therefore not necessary to discontinue the game immediately even if the recognition fails. If it is so configured that the game is discontinued in response to a recognition failure, the game may be discontinued frequently. Thus, in the present embodiment, the game is allowed to continue even if the recognition fails. Note however that since the recognition result cannot be used as a game input while the recognition is failing, if the game is allowed to continue long after the recognition fails, there will be a problem in the game because the player cannot perform a game operation. In view of this, in the present embodiment, the game is discontinued when a certain period of time elapses since the recognition fails. Since the game is discontinued in response to the display of the warning image, the game can be discontinued at a timing when the synthesized image is no longer displayed, and it is therefore possible to discontinue the game without giving awkwardness to the player.

Note that in other embodiments, the CPU 31 may discontinue the game at a timing when the recognition fails. For example, in a game where the recognition result is used as a game input and where the game operation requirements are severe, one may consider discontinuing the game in response to a recognition failure. In a case where the warning image is displayed so that it gradually grows thicker as in the game process described above, the CPU 31 may discontinue the game in response to the warning image being synthesized at a predetermined proportion with respect to the synthesized image. That is, in the game process described above, the CPU 31 may discontinue the game when the value of the failure counter is equal to a predetermined value between the first threshold N1 and the third threshold N3.

[Variation]

While the above embodiment is an example of how the present invention can be carried out, the present invention can be carried out with a configuration to be described below, for example, in other embodiments.

(Variation Regarding Image Processing Program)

While the above embodiment has been described with respect to a game program as an example of the image display program, the present invention can be used with any image display program using an augmented reality technique other than game programs.

(Variation Regarding Game)

While the above embodiment has been described with respect to a first-person shooter game in which an enemy object (the cannon 53) is displayed, as an example of the game executed by the game program, the present invention can be used with a game program of any game in which the game image is displayed using an augmented reality technique. For example, in the above embodiment, the action of the virtual object (player character) not displayed on the screen is controlled based on the recognition result. Here, in other embodiments, the game apparatus 1 may control the action of the virtual object displayed on the screen based on the recognition result. For example, games executed by a game program may include the following examples.

A game in which the position of the virtual object on the screen is determined based on the recognition result.

A crane object whose position in the virtual space is determined according to the positional relationship (recognition result) between the game apparatus 1 and the marker 52 appears, and the player controls the crane object to catch other objects placed in the virtual space.

A game in which the movement direction of the virtual object on the screen is determined based on the process result.

A billiard game in which a billiard ball is placed as the virtual object, wherein the player can strike the ball in the viewing direction of the virtual camera determined based on the recognition result (i.e., the movement direction of the ball is controlled by the positional relationship between the game apparatus 1 and the marker 52).

(Variation Regarding Condition Under which Warning Image is Displayed)

In the above embodiment, the game apparatus 1 displays the warning image on the condition that the recognition process has failed successively over a predetermined period of time. Here, in other embodiments, the game apparatus 1 may detect the movement of the camera (the game apparatus 1) and display the warning image on the condition that it is detected that the camera has moved greater than a predetermined criterion. The details of the variation where the warning image is displayed by detecting the movement of the camera will now be described.

Figure 13:
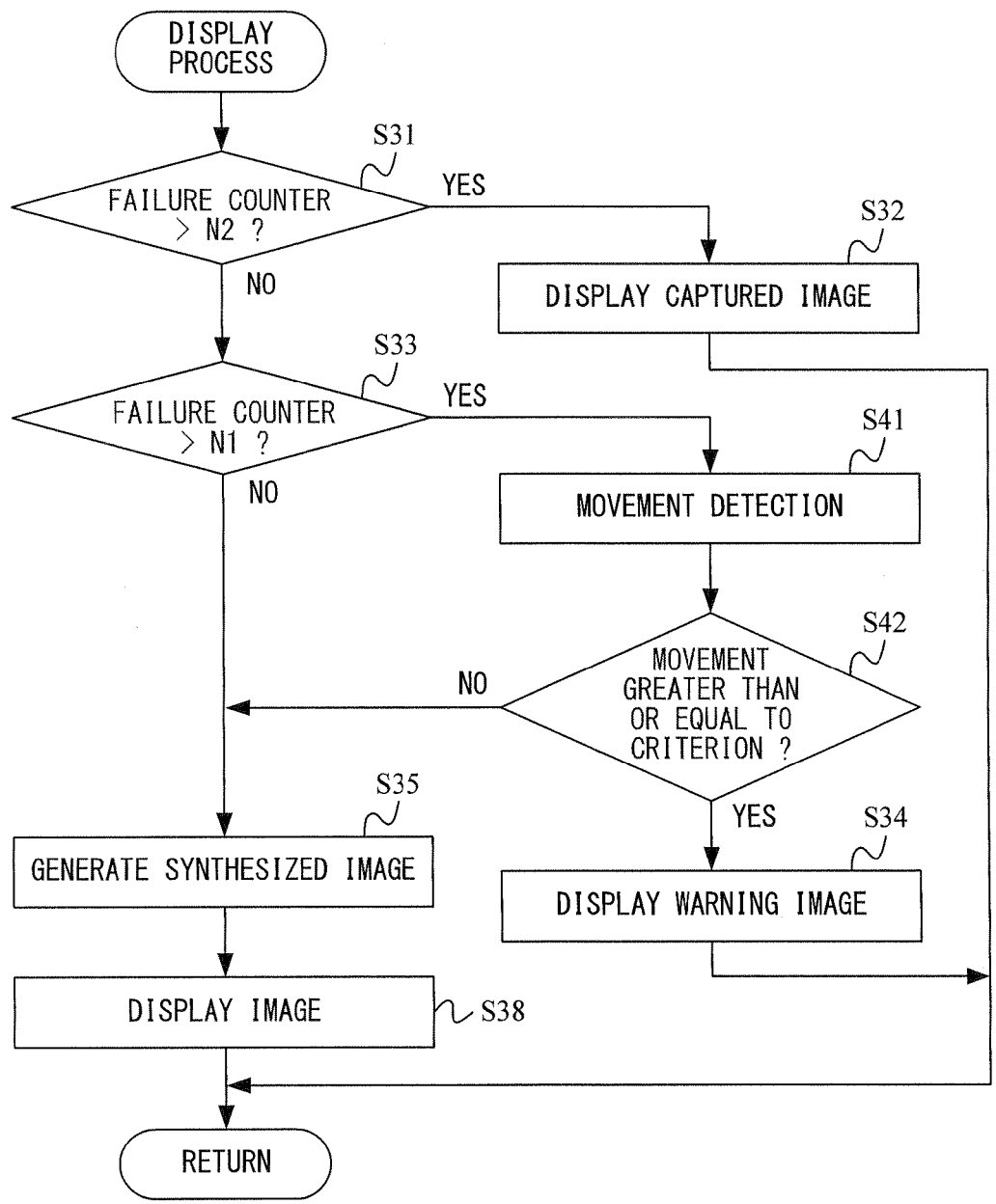
FIG. 13 is a flow chart showing a variation of a display process (step S5) in the present embodiment.

FIG. 13 is a flow chart showing a variation of a display process (step S5) in the present embodiment. Note that in FIG. 13, like processes to those of FIG. 12 are denoted by like step numbers and will not be described in detail.

In FIG. 13, if the determination result of step S33 is affirmative, the process of step S41 is executed. In step S41, the CPU 31 detects the movement of the camera (the game apparatus 1). While the movement detection method may be any method, if the game apparatus 1 includes an acceleration sensor or a gyro-sensor, for example, the CPU 31 obtains the detection results from these sensors. The CPU 31 may recognize a predetermined object (which may be a different object from the marker) from the captured image, and calculate the movement of the camera based on the movement of the predetermined object in the captured image. The process of step S42 is executed, following step S41.

In step S42, the CPU 31 determines whether the movement of the camera (the game apparatus 1) is greater than or equal to a predetermined criterion. The predetermined criterion may be, for example, the acceleration (angular velocity) of the camera being greater than or equal to a predetermined value, or the amount of movement of the camera (per unit time) being greater than or equal to a predetermined value. If the determination result of step S42 is affirmative, the process of step S34 is executed. On the other hand, if the determination result of step S42 is negative, the process of step S35 is executed.

As described above, in the variation shown in FIG. 13, a warning image is displayed (step S34) when the movement of the camera is more violent than a predetermined criterion, and the synthesized image continues to be displayed when the movement of the camera is less violent than the predetermined criterion. Here, one can assume it is likely that the marker 52 is outside the image-capturing range and can no longer be recognized if the camera has moved violently, and one can assume it is likely that the marker 52 is within the image-capturing range and the recognition will succeed again if the camera has not moved much. Therefore, according to this variation, in a case where recognition fails, the synthesized image continues to be displayed when it is assumed that the recognition will succeed again (that the recognition failure is temporary), and a warning image is displayed when it is unlikely that the recognition will succeed again. Thus, it is possible to display the warning image in more appropriate situations.

Note that although not shown, in the variation described above, the game discontinuation process (step S25) in the game control process (step S4) is preferably performed in response to the display of the warning image. That is, in the game control process, the CPU 31 may execute steps S41 and S42, as in FIG. 13, when the determination result of step S21 is affirmative, and execute step S25 when the determination result of step S42 is affirmative.

In the variation described above, the process of steps S41 and S42 may be executed immediately when recognition fails. That is, the first threshold N1 may be set to "1" or a very small value. In the variation described above, the process of displaying the captured image in step S32 may be executed on the condition that a predetermined period of time has elapsed from the display of the warning image.

As described above, according to the variation described above, it is possible to determine whether the recognition failure is temporary by detecting the movement of the camera (the game apparatus 1), and it is possible to appropriately determine the timing at which the warning image is displayed.

(Variation Regarding Game System)

While the above embodiment has been described with respect to a case where a series of processes for generating and displaying a synthesized image are executed by a single apparatus (the game apparatus 1), the series of processes may be executed by an information processing system including a plurality of information processing apparatuses in other embodiments. For example, in an information processing system including a terminal-side apparatus, and a server-side apparatus capable of communicating with the terminal-side apparatus via a network, the terminal-side apparatus obtains a captured image using a camera, and transmits the data of the captured image obtained to the server-side apparatus. The server-side apparatus, which has received the captured image data, executes the recognition process (corresponding to the recognition management process in step S3 in the above embodiment) and the game process (corresponding to the game control process in step S4 in the above embodiment), and transmits data of the game process result to the terminal-side apparatus. The data of the game process result is, for example, data of the game image, or data necessary for generating the game image. The terminal-side apparatus receives the data of the game process result, and displays the game image such as the synthesized image on the display apparatus based on this data. Thus, the present invention may be implemented as an information processing system including a plurality of information processing apparatuses.

As described above, the present invention can be used as a game program or a game apparatus, for example, for the purpose of, for example, displaying a virtual image with an augmented reality technique with increased realness.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an image display program comprising instructions for instructing a computer of an information processing apparatus capable of obtaining a captured image from an image-capturing section to provide:
   a recognition section for repeatedly executing a recognition process on the obtained captured image for recognizing a predetermined object included in the captured image;
   a synthesis section for repeatedly generating a synthesized image obtained by synthesizing an image of a virtual object generated by using a process result of the recognition process with a captured image which is a subject of the recognition process; and
   a display control section for displaying the synthesized image on a display section,
   wherein if the recognition process fails, the synthesis section generates the synthesized image for display by the display section to include a previously captured image which is a subject of a recognition process which has succeeded before, combined with an image of a virtual object generated by using a process result of the recognition process.

2. The storage medium according to claim 1, wherein the synthesis section generates a synthesized image by updating the image of the virtual object irrespective of the process result of the recognition process.

3. The storage medium according to claim 1, wherein:
   if the recognition process succeeds, the image display program instructs the computer to further function as a storage control section for storing, in a storage section that can be accessed by the computer, a captured image which is a subject of the successful recognition process and the process result of the recognition process; and the synthesis section synthesizes a captured image stored in the storage section with the image of the virtual object generated based on the process result stored in the storage section.

4. The storage medium according to claim 3, wherein if the recognition process succeeds, the storage control section updates storage contents of the storage section so that a captured image which is a subject of the successful recognition process and the process result of the recognition process are stored.

5. The storage medium according to claim 1, wherein:
if the recognition process succeeds, the recognition section calculates, as the process result, a positional relationship between the predetermined object recognized by the recognition process and the image-capturing section or the information processing apparatus; and
if the recognition process succeeds, the synthesis section generates the image of the virtual object based on the positional relationship calculated from a captured image which is a subject of the successful recognition process, and if the recognition process fails, the synthesis section generates the image of the virtual object based on the positional relationship calculated from a captured image which is a subject of a recognition process which has succeeded before.

6. The storage medium according to claim 1, wherein the image display program instructs the computer to further function as a game control process section for executing a predetermined game control process of controlling an action of an object appearing in a virtual space by using, as a game input, the process result of the recognition process.

7. The storage medium according to claim 6, wherein if the recognition process fails, the game control process section executes the game control process by using a process result of a recognition process which has succeeded before.

8. The storage medium according to claim 1, wherein the image display program instructs the computer to further function as a game process section for executing a predetermined game process irrespective of the process result of the recognition process.

9. The storage medium according to claim 8, wherein the game process section executes, as the game process, a process of controlling the action of the virtual object.

10. The storage medium according to claim 1, wherein the display control section displays a warning image different from the captured image on the display section in response to a predetermined condition being satisfied as a result of the recognition process having failed successively.

11. The storage medium according to claim 10, wherein the display control section displays the warning image on the display section based on the predetermined condition being the recognition process having failed successively over a predetermined period of time.

12. The storage medium according to claim 10, wherein:
the image display program instructs the computer to further function as a movement detection section for detecting a movement of the image-capturing section or the information processing apparatus; and
the display control section displays the warning image on the display section based on the predetermined condition being the movement detection section detecting that the image-capturing section or the information processing apparatus has moved greater than a predetermined criterion.

13. The storage medium according to claim 10, wherein:
the image display program instructs the computer to further function as a game control process section for executing a predetermined game control process of controlling the action of the virtual object by using, as a game input, the process result of the recognition process; and
the game control process section discontinues a progress of the game in response to display of the warning image.

14. The storage medium according to claim 10, wherein the display control section displays a captured image obtained at present on the display section in response to a predetermined condition being satisfied as a result of the recognition process having failed successively since the warning image is displayed.

15. The storage medium according to claim 1, wherein the display control section displays a captured image obtained at present on the display section in response to a predetermined condition being satisfied as a result of the recognition process having failed successively.

16. An image display apparatus capable of obtaining a captured image from an image-capturing section for displaying an image on a display section, comprising:
a recognition section for repeatedly executing a recognition process on the obtained captured image for recognizing a predetermined object included in the captured image;
a synthesis section for repeatedly generating a synthesized image obtained by synthesizing an image of a virtual object generated by using a process result of the recognition process with a captured image which is a subject of the recognition process; and
a display control section for displaying the synthesized image on the display section, wherein if the recognition process fails, the synthesis section generates the synthesized image for display by the display section to include a previously captured image which is a subject of a recognition process which has succeeded before, combined with an image of a virtual object generated by using a process result of the recognition process.

17. An image display system capable of obtaining a captured image from an image-capturing section for displaying an image on a display section, comprising:
a recognition section for repeatedly executing a recognition process on the obtained captured image for recognizing a predetermined object included in the captured image;
a synthesis section for repeatedly generating a synthesized image obtained by synthesizing an image of a virtual object generated by using a process result of the recognition process with a captured image which is a subject of the recognition process; and
a display control section for displaying the synthesized image on the display section,
wherein if the recognition process fails, the synthesis section generates the synthesized image for display by the display section to include a previously captured image which is a subject of a recognition process which has succeeded before, combined with an image of a virtual object generated by using a process result of the recognition process.

18. An image display method for obtaining a captured image from an image-capturing section and displaying an image on a display section, the method comprising:
repeatedly executing a recognition process on the obtained captured image for recognizing a predetermined object included in the captured image;
repeatedly generating a synthesized image obtained by synthesizing an image of a virtual object generated by using a process result of the recognition process with a captured image which is a subject of the recognition process; and displaying the synthesized image on the display section, wherein if the recognition process fails, a previously captured image which is a subject of a recognition process which has succeeded before is combined with an image of a virtual object generated by using a process result of the recognition process in the synthesis step.

19. An artificial reality image display apparatus including a display for continually displaying images of the real world combined with virtual objects, the image display apparatus comprising:

an image capture device that continually captures images of the real world;

a storage device that stores images captured by the image capture device;

a processing section coupled to at least the storage device, the processing section configured to continually analyze captured images by attempting to recognize at least one feature within the captured images;

the processing section generating an image of a virtual object based at least in part on successful recognition of the at least one feature in a captured image;

the processing section combining for display, the image of the virtual object with currently-captured images when the processing section is able to recognize the at least one feature in currently-captured images; and combining for display previously-captured images instead of currently-captured images when the processing section is unable to recognize the at least one feature in currently-captured images.

20. The image display apparatus of claim 19 further including a handheld housing, the image capture device, the storage device, and the processing section all being disposed in or on said handheld housing.

* * * * *